United States Patent
Dille et al.

(10) Patent No.: US 12,419,213 B2
(45) Date of Patent: Sep. 23, 2025

(54) AERODYNAMIC AND CENTRIFUGAL SEED ORIENTATION SYSTEM FOR AGRICULTURAL PLANTERS

(71) Applicant: Precision Planting LLC, Tremont, IL (US)

(72) Inventors: Mitchell R. Dille, Litchfield, MN (US); Keith T. Strang, Zimmerman, MN (US)

(73) Assignee: Precision Planting LLC, Tremont, IL (US)

( * ) Notice: Subject to any disclaimer, the term of this patent is extended or adjusted under 35 U.S.C. 154(b) by 1063 days.

(21) Appl. No.: 17/387,778

(22) Filed: Jul. 28, 2021

(65) Prior Publication Data

US 2022/0192079 A1  Jun. 23, 2022

Related U.S. Application Data

(63) Continuation-in-part of application No. 16/870,548, filed on May 8, 2020, now Pat. No. 11,751,501.

(60) Provisional application No. 62/885,965, filed on Aug. 13, 2019, provisional application No. 62/845,093, filed on May 8, 2019.

(51) Int. Cl.
*A01C 7/08* (2006.01)
*A01C 5/06* (2006.01)

(52) U.S. Cl.
CPC ............. *A01C 7/084* (2013.01); *A01C 5/062* (2013.01)

(58) Field of Classification Search
CPC ......... A01C 7/084; A01C 7/082; A01C 5/062; A01C 7/081; A01C 7/08; A01C 7/00; A01C 5/06; A01C 5/00
See application file for complete search history.

(56) References Cited

U.S. PATENT DOCUMENTS

| | | | |
|---|---|---|---|
| 2,618,373 A | 11/1952 | Hathaway |
| 2,783,918 A | 3/1957 | Bramblett |
| 2,935,957 A | 5/1960 | Denton |
| 3,134,346 A | 5/1964 | Mann |
| 3,195,485 A | 7/1965 | Reynolds |
| 3,217,674 A | 11/1965 | Williams |
| 3,482,735 A | 12/1969 | Goulter |
| 3,623,595 A | 11/1971 | Brown et al. |

(Continued)

FOREIGN PATENT DOCUMENTS

| | | |
|---|---|---|
| CA | 2876661 A1 | 12/2013 |
| CN | 101663935 B | 10/2012 |

(Continued)

*Primary Examiner* — Christopher J. Novosad

(57) ABSTRACT

A seed orientation apparatus and system has a seed transfer tube that receives randomly oriented seeds from an agricultural row planter seed meter and moves seeds from a seed collector to a curved pathway in a seed orientation coil assembly. The seed orientation coil assembly uses some combination of aerodynamics, centrifugal force, and path geometry to align the seed. The aligned seed is stabilized and entrained in an air stream and is subsequently discharged into a wedge-shaped furrow, detrained from the air stream, and wedged in the furrow before being covered by a closing wheel, thereby planting the aligned seed into the soil while achieving tip-down seed orientation with the germ facing an adjacent row. The seed orientation apparatus and system may be retrofitted onto existing planter row units. A method of planting is also described.

16 Claims, 11 Drawing Sheets

(56) References Cited

U.S. PATENT DOCUMENTS

| | | |
|---|---|---|
| 3,636,897 A | 1/1972 | Brink |
| 3,790,026 A | 2/1974 | Neumeister |
| 3,848,552 A | 11/1974 | Bauman et al. |
| 3,860,146 A | 1/1975 | Bauman et al. |
| 3,881,631 A | 5/1975 | Loesch et al. |
| 3,891,120 A | 6/1975 | Loesch et al. |
| 4,798,151 A | 1/1989 | Rodrigues, Jr. et al. |
| 5,082,141 A | 1/1992 | Martin et al. |
| 5,524,559 A | 6/1996 | Davidson |
| 5,601,209 A | 2/1997 | Barsi et al. |
| 5,603,269 A | 2/1997 | Bassett |
| 5,974,988 A | 11/1999 | Stufflebeam et al. |
| 6,148,748 A | 11/2000 | Bardi et al. |
| 6,178,901 B1 | 1/2001 | Anderson |
| 6,332,413 B1 | 12/2001 | Stufflebeanm et al. |
| 6,827,029 B1 | 12/2004 | Wendte |
| 7,270,064 B2 | 9/2007 | Kjelsson et al. |
| 7,426,894 B2 | 9/2008 | Peterson et al. |
| 7,509,915 B2 | 3/2009 | Memory |
| 7,735,626 B2 | 6/2010 | Cope et al. |
| 7,814,849 B1 | 10/2010 | Mcomber |
| 7,997,415 B2 | 8/2011 | Mongan et al. |
| 8,245,439 B2 | 8/2012 | Deppermann et al. |
| 8,286,387 B2 | 10/2012 | Becker et al. |
| 8,336,471 B2 | 12/2012 | Gilstring |
| 8,757,074 B2 | 6/2014 | Cruson |
| 8,789,482 B2 | 7/2014 | Garner et al. |
| 9,591,798 B2 | 3/2017 | Horsch |
| 9,861,025 B2 | 1/2018 | Schaefer et al. |
| 9,924,629 B2 | 3/2018 | Batcheller et al. |
| 10,412,879 B2 | 9/2019 | Cruson |
| 10,785,905 B2 | 9/2020 | Stoller et al. |
| 10,952,366 B2 | 3/2021 | Rhodes et al. |
| 2002/0144637 A1 | 10/2002 | Wendling et al. |
| 2003/0005867 A1 | 1/2003 | Richard |
| 2003/0159631 A1 | 8/2003 | Sauder et al. |
| 2006/0278726 A1 | 12/2006 | Holly |
| 2008/0257237 A1 | 10/2008 | Friesen et al. |
| 2012/0042813 A1 | 2/2012 | Liu et al. |
| 2013/0152836 A1 | 6/2013 | Deppermann et al. |
| 2015/0101518 A1 | 4/2015 | Arnold et al. |
| 2015/0122162 A1 | 5/2015 | Horsch |
| 2017/0181370 A1 | 6/2017 | Sheppard et al. |
| 2017/0245421 A1 | 8/2017 | Donolo et al. |
| 2018/0279545 A1 | 10/2018 | Pirkenseer et al. |
| 2019/0223372 A1 | 7/2019 | Koch et al. |
| 2019/0230846 A1 | 8/2019 | Koch et al. |
| 2019/0289778 A1 | 9/2019 | Koch et al. |
| 2019/0289779 A1 | 9/2019 | Koch et al. |
| 2020/0128725 A1 | 4/2020 | Rhodes et al. |
| 2020/0187410 A1 | 6/2020 | Bredeweg |
| 2020/0367425 A1 | 11/2020 | Dille et al. |
| 2022/0087097 A1 | 3/2022 | Leifker et al. |
| 2022/0192079 A1 | 6/2022 | Dille et al. |

FOREIGN PATENT DOCUMENTS

| | | |
|---|---|---|
| CN | 102893723 A | 1/2013 |
| CN | 102918963 B | 2/2013 |
| CN | 103609227 B | 3/2014 |
| CN | 104255130 B | 1/2015 |
| CN | 104938079 B | 9/2015 |
| CN | 107371486 A | 11/2017 |
| CN | 107439101 A | 12/2017 |
| CN | 108207212 A | 5/2018 |
| DE | 102019127467 A1 | 4/2021 |
| EP | 2901832 A1 | 8/2015 |
| GB | 1530263 A | 10/1978 |
| WO | WO 2005117564 A1 | 12/2005 |
| WO | WO 2020/227670 A2 | 11/2020 |
| WO | WO 2020/247985 A1 | 12/2020 |
| WO | WO 2021155008 A1 | 8/2021 |

$F_A$ = Air Force (Air Drag on Seed from Air Jets)
$F_C$ = Centrifugal Force (Apparent Force)
$F_{SF}$ = Riding Surface Friction

AERODYNAMIC AND CENTRIFUGAL SEED ORIENTATION SYSTEM FOR AGRICULTURAL PLANTERS

CROSS REFERENCE TO RELATED APPLICATIONS

The present application is a Continuation-In-Part of U.S. patent application Ser. No. 16/870,548 filed May 8, 2020 and entitled "Seed Orientation System for Agricultural Planters," which in turn claims the benefit of U.S. provisional patent applications 62/885,965 filed Aug. 13, 2019 and 62/845,093 filed May 8, 2019 of like title and inventorship, the teachings and entire contents of each which are incorporated herein by reference.

BACKGROUND OF THE INVENTION

1. Field of the Invention

The present invention pertains generally to a seeding device for agricultural row crop planters, and more specifically to a seed orientation system, apparatus, and method for placing seeds in the soil in an optimized growing orientation.

2. Description of the Related Art

Agriculture is an industry that has been and continues to be heavily shaped and influenced by industrialization. Progress has been made at a breath-taking pace. Each improvement in speed or reliability to complete a task provides a substantial reward to the farms, by enabling the same number of farm workers to farm ever-increasing acreage in a given amount of time. Because of these amazing gains in productivity that have and continue to be made, over the last five decades the cost of basic food necessities has dropped relative to other components of the general cost of living. This provides enormous benefit to society, since a safe and stable food supply for the ever-increasing population is vital to the health and well-being of individuals and the stability of governments and countries.

There are a number of different needs that must be improved upon for a farm work force to expand the amount of acreage being tended. These include more rapid and efficient planting of seeds or seedlings, more rapid and efficient tending of the crops between planting and harvest, and more rapid and efficient harvesting. Critically, both planting and harvest may have very short, unpredictable time windows within which a farm crew must complete the work. There are more times than any farm would like when the weather interferes with planting. As an example, a cold, late spring with late frost that is followed by substantial rains can leave the fields partially flooded and too muddy and soft to enter with the equipment. The farm is forced to wait for the field to dry, and this combination can leave the farm with only a few days to plant the crop. If they fail, precious acreage may be forced to sit idle, substantially reducing the crop yield and income that the farm receives. Similarly, germination rates can be significantly affected by temperature and moisture, so finding the optimum weather forecast and getting all of the land planted within that optimum weather window can also significantly affect crop yields.

Recognizing these needs, modern agricultural equipment manufacturers have strived and succeeded in producing ever larger and still highly reliable machinery that allows a farm work force to plant more seeds in less time. In contrast to the days of yore when a farmer used an ox or other farm animal to pull a single bottom plow, and then followed with seed by hand to plant that crop, modern machinery now plants many rows simultaneously, and at speeds of travel that can greatly exceed that which was previously possible.

Agricultural row crop planters typically include a seed hopper connected to a seed metering system that delivers seeds into a furrow formed by disc opener blades. A plurality of these row crop planters are typically mounted in parallel along a tool bar which is attached to a tractor. For example, it is common as of the time of this filing to have twenty-four or thirty-six row units attached to a single tractor.

For such a large assembly to be effective, the apparatus must be extremely reliable. With twenty-four "clones" of the equipment, the likelihood of failure is twenty-four times greater than it would be with a single row planter. When the row crop planter does fail, it is also critical that the equipment is quick and easy for the farm workers to repair or replace, because the repair time not only slows down the failed row, but planting is stopped for all twenty-four rows. The likelihood of failure and impact of repair time is even greater when the assembly is a thirty-six row planter.

Within a typical prior art row crop planter, seeds are delivered in bulk from the seed hopper to the metering system. The metering system precisely singulates the bulk seeds, and will most preferably provide these singulated seeds at very predictable and repeatable time intervals. There has been much development of improved metering systems, and these in general have proven to be quite reliable. The row crop planter subsequently delivers one seed at a time into the ground, typically into a furrow cut by the opener blades. The speed of release of individual seeds from the metering system is preferably adjustable, to properly control the spacing of the seeds based upon the speed of the tractor and row crop planters relative to the ground.

The standard method of seed delivery from the seed hopper to the ground is a gravity drop system that locates a seed tube inlet below the seed metering system. A singulated seed drops from the metering system down the seed tube and into a furrow prepared by opener blades disposed forward of the seed tube. This standard method of seed delivery, while a vast improvement over older techniques, leaves much room for improvement in desired seed placement, seed spacing, and relative velocity of the seed as it hits the ground. One very common issue today is that the seed tends to bounce unpredictably when it lands in the furrow, and can roll or tumble in either direction. Some seeds may stick when they land, while others may tumble for significant distances. This is particularly challenging as the speed of the planter relative to the ground increases, since the seeds that tumble or roll will have greater momentum to carry them farther from the intended target.

In order to obtain constant, uniform seed spacing at high planting speeds, apparatus have been devised that improve the delivery of the seed. Exemplary U.S. patents, the teachings which are incorporated herein by reference, include: U.S. Pat. No. 5,974,988 by Stufflebeam et al, entitled "Seed metering apparatus seed tube"; U.S. Pat. No. 6,332,413 by Stufflebeam et al, entitled "Seed tube for seed metering apparatus"; U.S. Pat. No. 8,336,471 by Gilstring, entitled "Arrangement of a seed metering device on an agricultural machine"; and U.S. Pat. No. 8,789,482 by Garner et al, entitled "Seeding machine with seed delivery system". The typical row unit such as that illustrated by Stufflebeam et al, Gilstring, and Garner et al delivers seeds to the furrow with the seed timing and therefore seed spacing more precisely controlled, even at significantly increased planting speeds than generally used in the prior art. In each of these patents this is accomplished by controlling the seed travel and bounce, though each patent does so with different techniques. The Stufflebeam et al patents provide a specially shaped curvilinear feed tube of low coefficient of friction material. Gilstring provides a high-speed air transport through a small diameter feed tube. Garner et al use a brush to separate and control movement of seed. However, none of these patents make any attempt to orient a seed, or provide any way to ensure the seed will remain oriented into the soil and while being covered with soil.

Optimizing seed orientation, tip down with germ facing adjacent row during planting, results in a quicker and more even emergence, increased light interception, and faster canopy closure resulting in reduced weed pressure. When the tip of the seed is pointed down into the ground, the root and coleoptiles do not waste time and energy wrapping around the seed. Thus the crop has quicker and more even emergence and greater stand uniformity.

There are further production advantages when the germ of the seed is orientated toward an adjacent row, generally perpendicular to the row the seed is in. The leaf structure of corn plants aligns with the germ/embryo direction. When the germ is facing toward the adjacent row, the leaves orient between rows and not over neighboring plants within the same row. As a result of optimized leaf structure there is greater light interception for the plant. Moreover, the optimized leaf structure provides a quicker canopy closure which preserves moisture and reduces weed pressure.

In contrast, with random orientation some plants emerge earlier or later than the majority of the crop, and some plants shade neighboring plants. Both contribute to substantially reduced yields, as evidenced by a number of studies. One exemplary thesis on the topic entitled "The Effects of Planting Techniques on Maize Grain Yield and Silage Production," by Tyler D. Kaufman in an Illinois State University publication dated Sep. 12, 2013, the teachings and contents which are incorporated herein by reference, establishes that an optimal seed orientation can improve yield by 14-19% for a given field. Clearly, there is much economic incentive for an agricultural row planter that provides this optimum seed orientation.

Some early pioneers devised apparatus to selectively orient seed. Exemplary U.S. patents, the teachings which are incorporated herein by reference, include: U.S. Pat. No. 3,134,346 by Mann, entitled "Corn planter"; U.S. Pat. No. 3,195,485 by Reynolds, entitled "Orientation planting apparatus"; and U.S. Pat. No. 3,217,674 by Williams, entitled "Groove forming, seed orienting planter shoe". Each of these disclose narrow slots through which a seed passes, thereby forcing the flat major surfaces of the seed to align with the walls of the slot. This provides orientation of the flat major surfaces, but fails to orient the seed with the point down. In addition, the seeds must be of predictable size, preferably pre-graded as described by Mann. Unfortunately, as also noted by Mann, even with graded seed there will be errant sizes of seed in a batch. Furthermore, and even with perfectly graded seed, during planting in the field these narrow slots are easily clogged by other debris and are difficult and time-consuming to clean.

Another approach to proper orientation of a seed is the use of a holder for the seed. One type of holder is illustrated by U.S. Pat. No. 3,636,897 by Brink, entitled "Apparatus for precision planting", the teachings which are incorporated herein by reference, which uses seeds pre-encapsulated into a disk-shaped seed capsule. As long as the seeds are properly oriented within the disk, then the seeds are fed through a gearing structure that retains and orients the disk. As may be appreciated, this machinery is unaware of the orientation of the seed point, and so like Mann and Reynolds just described, this provides orientation of the flat major surfaces, but fails to orient the seed with the point down. CN 101663935 by Lu et al, entitled "Corn directional seeding method, directional seed block manufacturing equipment and device for seeding seed blocks", the teachings which are incorporated herein by reference, improves upon the Brink patent by providing a seed holder that is uniquely shaped to establish orientation. Nevertheless, these seed encapsulations incur undesired cost associated with the creation of the seed capsule, extra volume required for seed storage prior to planting, and the potential for premature germination or spoilage as a result of encapsulation.

Another very common seed holder is an indeterminate length tape to which a seed is adhered. Seed tapes very precisely and uniformly space the seeds, and other substances such as herbicides or fertilizers may be disposed on the tape as well to aid in the growth and development of the seed. Such tapes have been manufactured for many years, particularly to benefit hobby gardeners, since the gardener may then much more quickly and precisely plant, with little or no seed waste. An exemplary U.S. published patent application illustrating larger commercial planters using seed tape, the teachings which are incorporated herein by reference, is 2013/0152836 by Deppermann et al, entitled "Seed tape planter".

Some artisans have recognized that the seeds may be oriented when adhered to the tape. Exemplary Chinese published patents applications, the teachings which are incorporated herein by reference, include: CN 103609227 by He et al, entitled "Method and device for producing corn orientated seed tape"; and CN 104255130 by He et al, entitled "Device for seeding of directional seed tape of corn", both applied for by the Agricultural University of China.

Unfortunately, and similar to the seed capsules, there is: extra expense associated with the creation of the seed tape, including extra steps and handling if seeds are to be oriented; extra volume required for seed storage prior to planting; and the potential for premature germination or spoilage as a result of placement on the tape. In addition, the adhesion of the seed to the tape can be unpredictable and hard to adequately control, the tape acts as a waste material that can interfere with seed germination and growth, and the tape is quite difficult to reliably insert into the ground and then properly cover at high speeds. As described in CN 108207212 by Chen et al, entitled "Oriented corn seed cartridge manufacturing apparatus" and also applied for by the Agricultural University of China, the teachings which are incorporated herein by reference, the aforementioned CN 103609227 and CN 104255130 suffer from the "following deficiencies: 1) The seed belt is difficult to manufacture and lay out, and the efficiency is low; 2) The seed reel is bulky and inconvenient to store."

As an alternative to the seed tape, CN 108207212 proposes a cartridge that contains oriented corn seed. The cartridge has been designed to make manufacturing and seed insertion easier, and to reduce the bulk of a seed tape. Nevertheless, use of the cartridge still requires moving the seed from the cartridge to the soil while maintaining orientation, and the patent fails to disclose how this is achieved. As noted herein above, movement of the seed without losing orientation has been an obstacle that has not been overcome in the prior art. In addition, the cartridge still runs the challenges experienced even with the earliest patent by Mann incorporated by reference herein above, including:

challenges of proper handling and storage in the cartridge of errant sizes and geometries of seed; tendency for clogging and jamming during planting; difficulties and time-consumption required to clean; and in the case of the magazine, the necessarily limited size and need for frequent changing when planting large areas.

For scientific testing and laboratory analysis, some artisans have painted corn seed while still on the kernel with iron-containing paint. Once the corn is painted, then it is separated from the cob. The iron paint then allows the corn seeds to be oriented by application of a magnetic field. Exemplary U.S. and Foreign patents and published applications, the teachings which are incorporated herein by reference, include: U.S. Pat. No. 7,735,626 by Cope et al, entitled "Apparatus, method and system for handling, positioning, and/or automatically orienting objects"; U.S. Pat. No. 7,997,415 by Mongan et al, entitled "Apparatus, method and system for creating, collecting and indexing seed portions from individual seed"; and U.S. Pat. No. 8,286,387 by Becker et al, entitled "Apparatus, method and system for creating, handling, collecting and indexing seed and seed portions from plant seed". This technique is very innovative and can be extremely useful for various laboratory procedures, but too much iron in the soil can stunt plant growth and discolor foliage, weakening and eventually killing the plant. Continued application of iron through multiple seasons can result in iron accumulations within the soil as well, compounding the problem. Consequently, while developed for laboratory use, no techniques are disclosed to handle seed during planting using this technique.

A number of artisans have applied robotics, often with computer vision systems, to orient seeds and plants. Exemplary U.S. and Foreign patents and published applications, the teachings which are incorporated herein by reference, include: U.S. Pat. No. 2,935,957 by Denton, entitled "Bulb planter"; U.S. Pat. No. 8,245,439 by Deppermann et al, entitled "Automated high-throughput seed sampler and methods of sampling, testing and bulking seeds"; U.S. Pat. No. 9,924,629 by Batcheller et al, entitled "Method and system for optimizing planting operations"; 2019/0223372 by Koch et al, entitled "Systems, implements, and methods for seed orientation within agricultural fields"; 2019/0230846 by Koch et al, entitled "Systems, implements, and methods for seed orientation with adjustable singulators during planting"; 2019/0289778 by Koch et al, entitled "Systems, implements, and methods for seed orientation within agricultural fields using a seed firmer"; 2019/0289779 by Koch et al, entitled "Systems, implements, and methods for passive seed orientation within agricultural fields"; 2020/0187410 by Bredeweg, entitled "Apparatus and methods: planter meter for orienting seed and in soil seed placement"; and WO 2020/247985 by Leifker et al, entitled "Site-specific seed orientation for optimal crop growth". While robotics and vision technologies have advanced, the combination of a seed-orienting robotics system with a vision system disposed close to the ground is nevertheless expensive, difficult to operate at high speed, and prone to failure in the harsh planting environment. As noted herein above, with twenty-four or thirty-six rows being planted simultaneously, the likelihood of failure is also twenty-four or thirty-six times greater. When only one row crop planter fails, the entire machine is shut down, stopping planting of all rows.

Similar to Gilstring incorporated by reference and described herein above, and somewhat less relevant to the present invention, a number of artisans have moved seed by air for transport through a planting apparatus. Such apparatus are sometimes referred to as air seed planters. Exemplary U.S. patents and published applications, the teachings which are incorporated herein by reference, include: U.S. Pat. No. 2,783,918 by Bramblett, entitled "Metering planter devices"; U.S. Pat. No. 3,482,735 by Goulter, entitled "Seed sower or other distributing device"; U.S. Pat. No. 3,790,026 by Neumeister, entitled "Corn planter"; U.S. Pat. No. 3,848,552 by Bauman et al, entitled "Seed dispenser for planters"; U.S. Pat. No. 3,860,146 by Bauman et al, entitled "Seed dispensing mechanism"; U.S. Pat. No. 3,881,631 by Loesch et al, entitled "Monitor for air pressure type seed planter"; U.S. Pat. No. 3,891,120 by Loesch et al, entitled "Operation monitor for air pressure type seed planter"; U.S. Pat. No. 5,524,559 by Davidson, entitled "Method and apparatus for sowing seed"; U.S. Pat. No. 5,601,209 by Barsi et al, entitled "Seed metering apparatus"; U.S. Pat. No. 5,603,269 by Bassett, entitled "Mechanism for planting agricultural seed"; U.S. Pat. No. 6,148,748 by Bardi et al, entitled "In-line seed treating unit for air seeders"; U.S. Pat. No. 6,827,029 by Wendte, entitled "Method and apparatus for automatically maintaining seed trench depth during seed planting operations"; U.S. Pat. No. 7,270,064 by Kjelsson et al, entitled "Apparatus for discrete distribution of granules"; U.S. Pat. No. 7,509,915 by Memory, entitled "Cyclone assisted product delivery system for soil openers"; U.S. Pat. No. 8,757,074 by Cruson, entitled "Decelerating device for air conveyed material"; U.S. Pat. No. 9,591,798 by Horsch, entitled "Distributing unit for granular material, in particular a seeding unit"; U.S. Pat. No. 10,412,879 by Cruson, entitled "Decelerating device for air conveyed material"; and 2020/0128725 by Rhodes et al, entitled "Seed positioning device, seed dispensing system, and method of dispensing seed". However, the air flow is used for transport only, and none of these patents make any attempt to orient a seed or provide any way to ensure the seed will remain oriented into the soil and while being covered with soil.

In addition to the Williams patent incorporated herein above by reference, other artisans have devised improved furrow opening and forming apparatus. Exemplary U.S. patents, the teachings which are incorporated herein by reference, include: U.S. Pat. No. 4,798,151 by Rodrigues, Jr. et al, entitled "Furrow opening point"; and U.S. Pat. No. 6,178,901 by Anderson, entitled "Seed boot and seed positioner".

Other diverse and somewhat less relevant seed and leaf orientation apparatus are illustrated in U.S. and Foreign patents and published applications, the teachings which are incorporated herein by reference, include: U.S. Pat. No. 2,618,373 by Hathaway, entitled "Tobacco arranging machine"; U.S. Pat. No. 3,623,595 by Brown et al, entitled "Tobacco leaf orienting machine"; U.S. Pat. No. 7,814,849 by McOmber, entitled "Seed tube for an agricultural planter"; U.S. Pat. No. 9,861,025 by Schaefer et al, entitled "Seed planting apparatus, systems and methods"; U.S. Pat. No. 10,785,905 by Stoller et al, entitled "Liquid application apparatus comprising a seed firmer"; CN 102893723 by Hou et al, entitled "Corn seed orientation method and device"; CN102918963 by Hou et al, entitled "Corn seed directional separation spacing seed-arrangement device and operation method thereof"; CN 107371486 by Chen et al, entitled "Orientating corn seed sowing device and sowing method thereof"; and CN 107439101 by Duan et al, entitled "Corn seed edge-on scoop orientation fixed-distance output apparatus". Interestingly, the latter CN 107439101, also applied for by the Agricultural University of China, discusses both CN 102893723 by Hou et al and another, CN102918963 also by Hou et al, noting that the CN 102893723 device structure is complex, the success rate of the orientation is low, and the corn seed can not be operated at a distance; and noting that the CN102918963 device is complex, and the corn seed orientation and the distance are separately carried out, such that when the corn seed which is oriented in a flat-lying position is positioned (presumably for planting or the like), the original orientation result is easily destroyed with the root tips of the radicles no longer aligned in a forward direction.

In addition to the foregoing patents, Webster's New Universal Unabridged Dictionary, Second Edition copyright 1983, is incorporated herein by reference in entirety for the definitions of words and terms used herein.

In spite of the long-standing substantial economic incentive, long-term awareness, and substantial research and development that has been conducted, evidenced by the fact that the Kaufman paper as of this writing is more than seven years old, that several studies referenced by Kaufman are more than thirty years old, that the Mann, Reynolds, and Williams patents incorporated by reference herein above are more than fifty years old, and the many other patents and publications described and incorporated herein above, proper and consistent seed orientation has not been successfully economically implemented in commercial agricultural row planters. Thus there remains a need for a seed orientation system that economically and efficiently plants the seeds tip down and germ facing the next row in a furrow.

SUMMARY OF THE INVENTION

In a first manifestation, the present invention comprises a novel seed orientation system generally consisting of a geometrically optimized orienting device wherein air flow in combination with centrifugal force is used to orient the seed. Seed travel through a helical pathway creates a centrifugal force to maintain seed stability and contact with the pathway throughout transport. An airflow parallel to the seed travel direction within the helical pathway also serves to orient the seed in a tip first disposition. An optional component of the airflow or centrifugal force transverse to the seed direction aids in locating the seed against a guide rail. A novel exit path and capture/closing system is included to maintain the seed orientation through to the final covering in the ground.

The novel seed orientation system is configured to be mounted to a row unit on an agricultural planter between the furrow opener and row closers. The seed orientation system receives seed from the existing planter singulator meter in any orientation, orients the seed tip-down with germ facing across the row, and then injects/plants the seed into the ground in that preferred orientation. Orientated seeds deliver better root growth and earlier/more even emergence. Moreover, corn leaves are better orientated when seeds are planted with the germ facing adjacent rows. This effect maximizes sunlight and the crop reaches canopy more quickly, optimizing weed control and moisture conservation.

The components and terminology of the present invention are directed to a corn kernel. Although corn is the seed type presented, this benefit is not limited to only corn. In general, yield for fields of corn are optimized when the corn seed is tip-down with germ facing the adjacent row. The benefits of proper planted seed orientation also apply to other crop types. Consequently, where planted seed orientation is important and can be controlled using the present teachings, the present invention will increase production and yield for a variety of crops.

In a second manifestation, the present invention is a seed orientation system for use with an agricultural planting machine, the seed orientation system comprising: a seed collector for receiving seed from the agricultural planting machine; a seed transfer tube operably connected to the seed collector at a first end; a seed orientation coil assembly connected to a second end of the seed transfer tube, the seed orientation coil assembly defining a helical pathway from a seed entry aperture to an oriented seed exit aperture; and a sub-furrow opener disposed adjacent to the oriented seed exit aperture, said sub-furrow opener including a wedge to slice a miniature sub-furrow within a planter furrow.

The agricultural planting machine may be a row planter attached by various means to a tractor. The typical corn row planter includes a seed hopper for holding the bulk seed. The seed hopper includes an opening to direct the seed to a seed meter. Delivery of the seed may typically be by a vacuum method but other delivery methods are envisioned. The seed meter then attempts to singulate the seed and spaces the seed out for delivery into the ground. The metered seed then flows into a seed tube which transports the seed into a furrow. It is envisioned that the seed could come directly from a seed hopper if a meter is not required. At least one closing wheel then closes the furrow about the seed. In such a prior art planting machine, the seed falls from the seed tube into the furrow in a random orientation in an uncontrolled manner.

In order to improve seed orientation in this manifestation, the present invention connects a seed orientation system to the existing seed tube. The seed orientation system includes a seed orientation support structure that includes one or more connection flanges so as to connect to the agricultural planting machine. The seed orientation support structure further includes support connections for the seed collector and the seed orientation coil assembly. The seed orientation support structure can include a mounting assembly for a sub-furrow opener. The seed orientation support structure also prevents soil and debris from entering the furrow from the opener wheels back to where the seed is inserted.

In some cases, the existing seed tube may be replaced in its entirety by a seed collector and a seed transfer tube. The seed pathway of the seed collector and the seed transfer tube will reduce the change of direction and tumbling imparted on the seed by using the existing seed tube. A seed orientation support structure will optionally provide support to the seed collector. The seed orientation support structure will include one or more connection flanges so as to connect to the agricultural planting machine. The seed collector and seed transfer tube may be connected at a first end to the row unit shank positioned at the seed meter exit and at a second end to a seed orientation coil assembly. The seed orientation support structure may further include support connections for the seed collector and the seed orientation coil assembly.

The seed orientation system may include an air supply system. The air supply system may be independent or connected to an air system of the row unit, planter frame or the tractor. The air system may include connections to provide an air flow to the seed orientation coil assembly. The air system may also provide air to the seed collector and seed transfer tube when using an existing seed tube. The air system may further provide air to the seed collector in the embodiment where the seed tube is exchanged for a more efficient seed path. This feed path might be a dedicated air feed line that doesn't contact the injector core or may be from the injector core acting as a manifold.

The seed is transported from the seed transfer tube to the seed orientation coil. The helical pathway of the seed orientation coil assembly is disposed within an outer coil, the outer coil including a central aperture in which an injector core is disposed. The pathway may be a curved shape as well. The injector core is a cylindrical structure defining an open central region. At a first end, the injector core is operably connected to an incoming air line. The incoming air feed at the top of the injector core is branched into two paths. The first path is to the seed collector, and the second path is to the injector core that feeds at least one nozzle. In some manifestations the airflow from the injector core nozzles hits the seed at an angle somewhere around 45 degrees, which has a parallel and perpendicular component on the seed. In other manifestations, the angle of the airflow from the at least one injector core nozzle will hit the seed at an angle approaching parallel with the seed path. The incoming air feed is operably connected to a first end of the injector core. At a second end, the injector core is closed by an end wall. In alternative manifestations, the second end of the injector core may contain some additional venting. In some manifestations, the injector core includes an injector vent system disposed through an outer wall of the injector core. The injector vent system includes at least one and in some manifestations a plurality of vent holes or nozzles disposed about an exterior wall of the outer coil. In some manifestations, the vent holes are circular, but in other manifestations the vent holes will take at least one of a variety of shapes, placements and angles about the injector core.

The helical pathway of the outer coil includes a seed riding surface that intersects a seed guide wall, the seed riding surface leading to a seed exit path. In one manifestation, the seed riding surface profile resembles that of a banked roadway, having a generally flat surface that the seed slides upon, but sloped or angled radially outward and upward, again in the manner of the banking of a roadway curve. As is understood in civil engineering, in the design of a roadway the slope or angle is optimized to a particular speed to keep a vehicle centered on the road, not climbing or falling and instead staying within the traffic lane. In the present invention, the slope or angle is preferably not as great as a roadway, so the seed will climb outward and upward to an intersection area where the seed guide wall adjoins the seed riding surface. Rather than a generally flat surface of the seed riding surface profile, in some manifestations the path profile may alternatively be circular or curved. The helical pathway includes three revolutions but embodiments with less or more than three revolutions are envisioned. The pathway in some manifestations will not be helical in shape, but instead will be curved or of other or a combination of shapes, so long as the pathway can achieve a centrifugal force upon the seed. Injectors may be singular or multiple along the curved path, following the curvature of the path. The vented outer coil preferably uses a smooth surface to slide a seed and to retain stability and orientation, preventing rotation and/or tumbling.

The vented outer coil helical pathway includes a seed entry aperture at a first end and the seed exit path at the second end. At least one nozzle directs airflow from the injector core generally parallel along the pathway. In some manifestations, the outer coil will include air vents on the exterior wall of the outer coil.

Regarding seed positioning, the seed has two major flat sides, one of which has the germ on it. Therefore, the germ will point out perpendicular from or normal to one of the flats on the seed. Since the seed rides on one of these flat sides along the seed path and is injected into the ground with these flat surfaces parallel to the planting row, the germ will always face perpendicularly into the area between rows instead of facing toward another seed in its current row. The benefit of this is the emerging corn plant will align its leaf structure into the space between rows versus overlapping neighboring plants.

The exit path from the helical pathway includes a curved shape that continues the seed riding surface into the ground. The seed will have aerodynamic forces from the air stream that are opposed by the surface drag of the curved exit path and stabilized by the centrifugal force created by the curvature of the curved exit path so as to ride the curved exit path without altering its tip down orientation.

A sub-furrow opener is positioned below and forward of the exit path with respect to the direction of travel. The sub-furrow opener features a slicing wedge shape to form the soil so as to pinch/wedge the seed and maintain its orientation. It is envisioned that the seed has sufficient downward velocity to be propelled into the sub-furrow. The seed is thus retained in an interference fit into the sub-furrow. It is envisioned that the shape of the wedge could be varied. A closing wheel, disc, or blade positioned next to the seed may help capture the seed instead of fully relying on an interference fit or wedge.

The profile of the sub-furrow opener needs to taper down to allow seeds of all sizes to be captured. The profile most preferably will also have an extended bottom to prevent the seed tip from hitting the bottom of the sub-furrow and recoiling out before becoming wedge/taper locked.

The angle of the exit path from the coil will in some embodiments be chosen to reduce the horizontal seed-to-ground velocity delta. Preferably, at a typical 5 mph planting speed and a 3 mph horizontal seed velocity component, the horizontal seed-to-ground velocity delta should be reduced to about 2 mph. At a slower 3 mph planting speed, the seed would be propelled into the sub-furrow with a zero horizontal seed-to-ground velocity delta. However, this speed is dependent on the horizontal component of the actual exit speed of the seed and will vary depending on overall system air availability. In addition, and as will be apparent to those reasonably skilled in the art, changing the angle of the exit path will also alter the overall seed orientation when the seed is wedged into the soil. Consequently, the selection of an exit path angle will be made with appropriate consideration for both of the acceptable target seed orientation and seed-to-ground velocity differential.

The angle of the exit path in some embodiments also or alternatively will be varied to provide finer control of the seed orientation. For exemplary and non-limiting purpose, fine adjustment in some embodiments is used to compensate for any action or effect of the closing wheel that might cause the already deposited seed to rotate about an axis transverse to the row during the closing of the soil about the seed.

In a third manifestation, the present invention is a seed orientation system for positioning a seed in a furrow. The seed orientation system comprises a seed orientation coil disposed so as to receive seeds from a planter. The seed orientation coil includes a curved seed path, and a pressurized air system to direct an air flow parallel to the curved path. Furthermore, the parallel airflow directs the seed into a seed tip down orientation on a flat side of the seed and propels the seed down the curved path to a seed exit path. The curved path may have a helical shape and the curved seed path may comprise a seed guide wall and a seed riding surface. The pressurized air system may include a plurality of nozzles to direct a radial airflow over the curved path and out a series of vents.

In a fourth manifestation, the present invention is a seed orientation system for delivering an oriented seed to a furrow. The seed orientation system comprises a seed transfer assembly for receiving the seed from an agricultural planting machine and providing a pathway for the seed to a seed orientation coil assembly; a seed orientation coil assembly connected to the seed transfer assembly, the seed orientation coil assembly defining a curved pathway for the seed from a seed entry aperture to a seed exit aperture; and a sub-furrow opener disposed adjacent to the seed exit aperture, the sub-furrow opener including a wedge to slice a furrow below a planter furrow. The seed transfer assembly may include a seed collector or a seed transfer tube or other connection devices. The seed transfer assembly further includes a seed receiving aperture and an air line connection to provide air to the seed transfer assembly.

In a fifth manifestation, the present invention further includes a method for planting an oriented seed using a seed planter, the method comprising; positioning a seed orientation system on the seed planter, the seed orientation system operably positioned to receive a seed from the seed planter; connecting a pressurized air line to a seed orientation coil assembly; connecting a seed collector air line from the seed orientation coil to a seed collector; propelling the seed from the seed collector through a seed transfer tube to the seed orientation coil assembly; feeding the seed into a vented outer coil of the seed orientation coil, said vented outer coil defining a helical pathway to a seed exit path, the vented outer coil including a plurality of air vents disposed through an outer wall of the vented outer coil; injecting air into an injector core of the seed orientation coil, the injector core including a plurality of air injectors disposed about an outer wall of the injector core; orientating the seed into position as air is flowing over the seed, the seed subjected to a centrifugal force as it is propelled through the helical pathway; holding the seed in a tip down orientation within the helical pathway; directing the seed to the seed exit path; and scoring a sub-furrow inside a main furrow that is used to capture or wedge the seed to retain its orientation.

The method further includes maintaining an airflow through the injector core and the vented outer coil so as to push the seed up the seed riding surface to the seed guide wall, with the assistance of centrifugal force induced on the seed as it travels its curved/helical pathway. The vented outer coil includes a seed riding surface and a seed guide wall. The seed riding surface is angled radially outward to where it intersects the seed guide wall. The airflow from the injectors hit the seed at an angle, giving two main (pressure) force vector components on the seed. One component pushes parallel to the seed path and the other pushes perpendicular to the seed path. The parallel component of the airflow flows from behind the seed and over the seed, which both propels the seed forward and causes the seed to orient tip forward in the flow as this orientation has the lowest stable aerodynamic cross section (lowest drag). Any perpendicular component of the airflow, combined with centrifugal force, gently pushes the seed into the seed riding surface and guide wall to provide the stability needed to maintain the tip-forward orientation. Control of the relative magnitude of forces on the seed from the adjacent seed riding surface and the guide wall is achieved by control of: the radius of curvature of the seed pathway; rate of change of the radius of curvature of the seed pathway; the extent of banking; the seed velocity along the seed path; change in direction of the seed path along one or multiple axes; the extent of the contact surface area, surface finish, and coefficients of friction; the extent and geometry of nozzles and venting; the air pressure provided to the nozzles; and the angle of the injector airflow.

In a sixth manifestation, the present invention is a method for planting a seed in an oriented position by using a seed orientation coil assembly. The seed orientation coil assembly includes a curved seed path and at least one nozzle directed to the curved path. The method comprises the steps of: propelling the seed from a seed hopper to the seed orientation coil assembly; directing the seed into a vented outer coil of the seed orientation coil assembly, the vented outer coil defining the curved seed path to a seed exit path, the vented outer coil including a plurality of air vents disposed radially about an outer wall of the vented outer coil; directing pressurized air into an injector core of the seed orientation coil, the injector core including the plurality of air injector nozzles disposed radially about an outer wall of the injector core, the nozzles directed radially at the seed on the curved path; orientating the seed into the orientated position by directing an air flow over the seed parallel to the seed path and transverse to the seed path, the seed subjected to a centrifugal force as it is propelled through the curved pathway; maintaining the seed in a seed tip forward orientation through air flow over the seed and contact with the curved pathway, and directing the seed to ride down the seed exit path to be planted with seed tip down and seed flat side pointed at an adjacent seed row.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
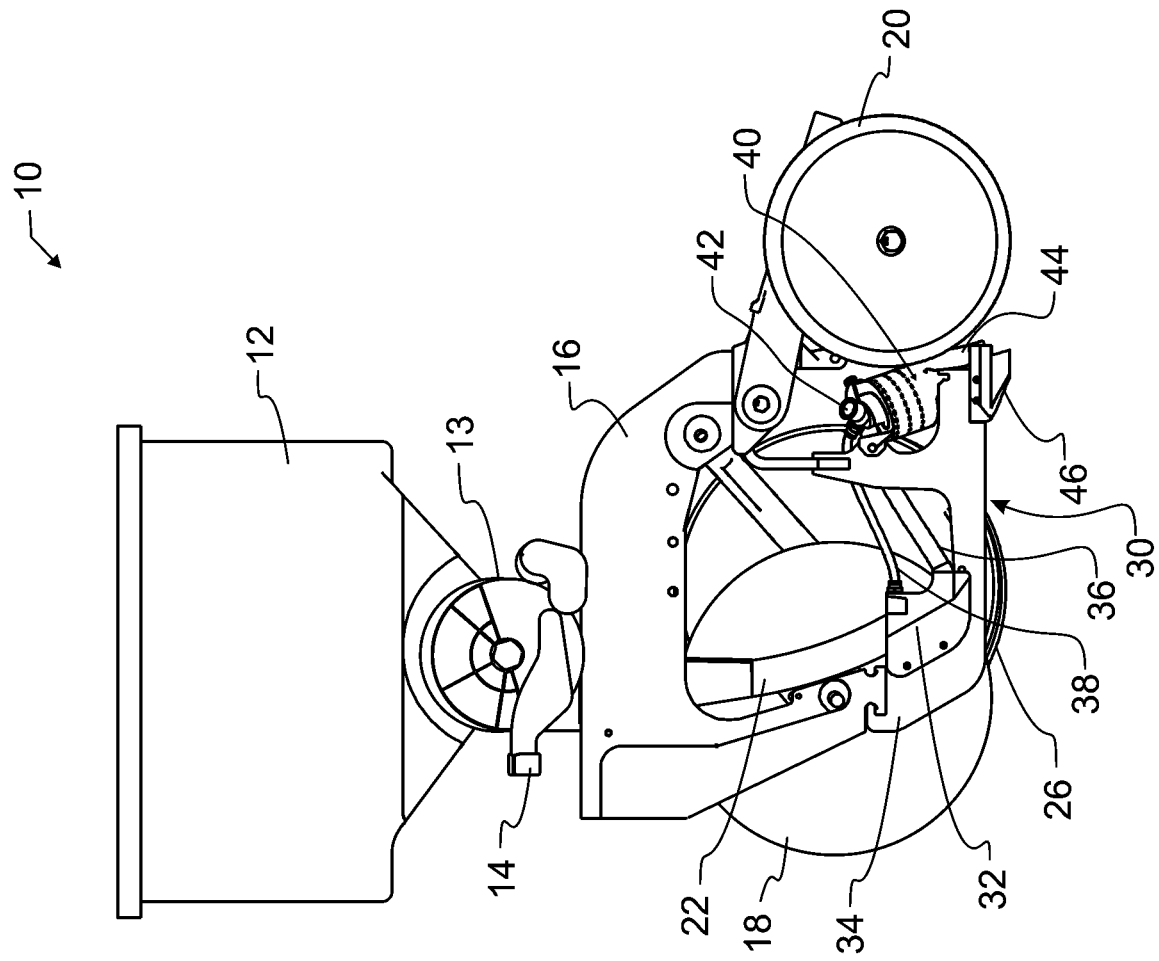
FIG. 1 illustrates a side elevational view of a first embodiment of the seed orientation system integrated into a planter row unit.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DESCRIPTION OF THE PREFERRED EMBODIMENT

FIG. 1 illustrates a row unit 10 with the seed orientation system 30 of the present invention installed. Row unit 10 is an example of a commonly found planter unit designed for the purpose of delivering a seed into a furrow, for exemplary and non-limiting purposes such as that illustrated by the Stufflebeam et al, Gilstring, and Garner et al patents incorporated by reference herein above. As shown in those patents, row unit 10 is typically mounted to a tool bar that attaches to a tractor or similar towing device along with other identical or similar planting row units. While not solely limited thereto, row units are presently found in even number groups from a few units to as many as forty-eight row units.

The typical row unit 10 includes seed hopper 12 for storing the seed for planting. The seed moves from seed hopper 12 to a seed meter 13. Seed meter 13 singulates the seed at a desired spacing for delivery to the ground. Seed meter 13 may for exemplary and non-limiting purpose use a conventional vacuum disk driven by a vacuum delivery line 14. From seed meter 13, in a typical prior art row unit the seed is delivered to the ground through seed tube 22.

In the typical row unit 10, a shank structure 16 provides structural support for seed hopper 12, seed meter 13 and seed tube 22. At least one opener blade 18, at least one gauge wheel 26, and at least one closing wheel 20 are also attached to the shank 16. Opener blade 18 forms a trench or furrow in the soil ahead of seed tube 22. Gauge wheel 26 controls the depth of the furrow, and closing wheel 20 subsequently closes the furrow over the seed.

In a first embodiment and as illustrated in FIG. 1, seed orientation system 30 is mounted to row unit 10. Seed orientation system 30, which is more clearly illustrated in FIGS. 2 and 3, includes a seed collector 32 operably attached to seed tube 22. Seed collector 32 gathers the seed and changes its direction by way of a seed transfer tube 36 to a seed orientation coil assembly 40. The seed passes through the helical path of the seed orientation coil assembly 40 to an oriented seed exit path 44. A sub-furrow opener 46 creates a wedge shaped trough within the furrow for capturing the oriented seed.

Movement of the seed throughout seed orientation system 30 is aided by air from a central blower/fan such as is commonly found in prior art planters, or which may be separately provided if so required as will be apparent to those reasonably skilled in the art. In some alternative embodiments, a turbine or other air source may be provided within the interior of seed orientation coil assembly 40, for exemplary and non-limiting purpose within the interior of injector core 58. Air is first directed to system air infeed 42 disposed on the upper face of the seed orientation coil assembly 40. An air line 38 is then directed to seed collector 32 for moving the seed from seed collector 32 to the seed orientation coil assembly 40. While air is most preferred owing to both ready availability, low cost, and presence of blowers on most equipment, it will be appreciated in alternative embodiments that other fluid sources will be provided, which for exemplary and non-limiting purposes will include such sources as compressed or liquified nitrogen, carbon dioxide, or other suitable fluids or fluid blends.

A seed orientation support structure 34 provides structural support for seed collector 32, seed transfer tube 36, seed orientation coil assembly 40 and sub-furrow opener 46. The seed orientation support structure 34 may be connected to shank structure 16 at one or more locations. The seed orientation support structure 34 also acts to keep debris out of the furrow and to protect against rock impacts.

Figure 2:
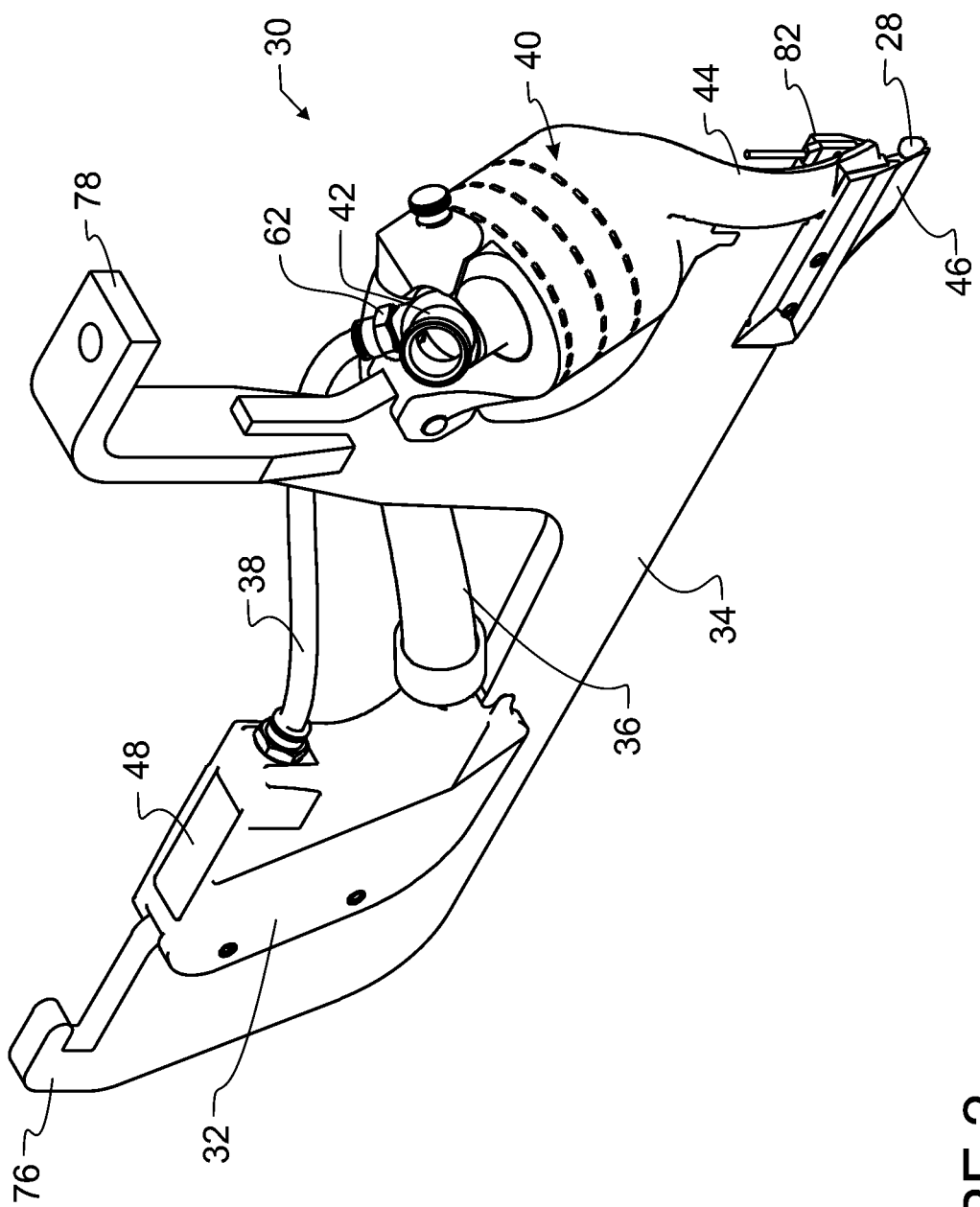
FIG. 2 is a perspective view of the first embodiment of the seed orientation system.
Figure 3:
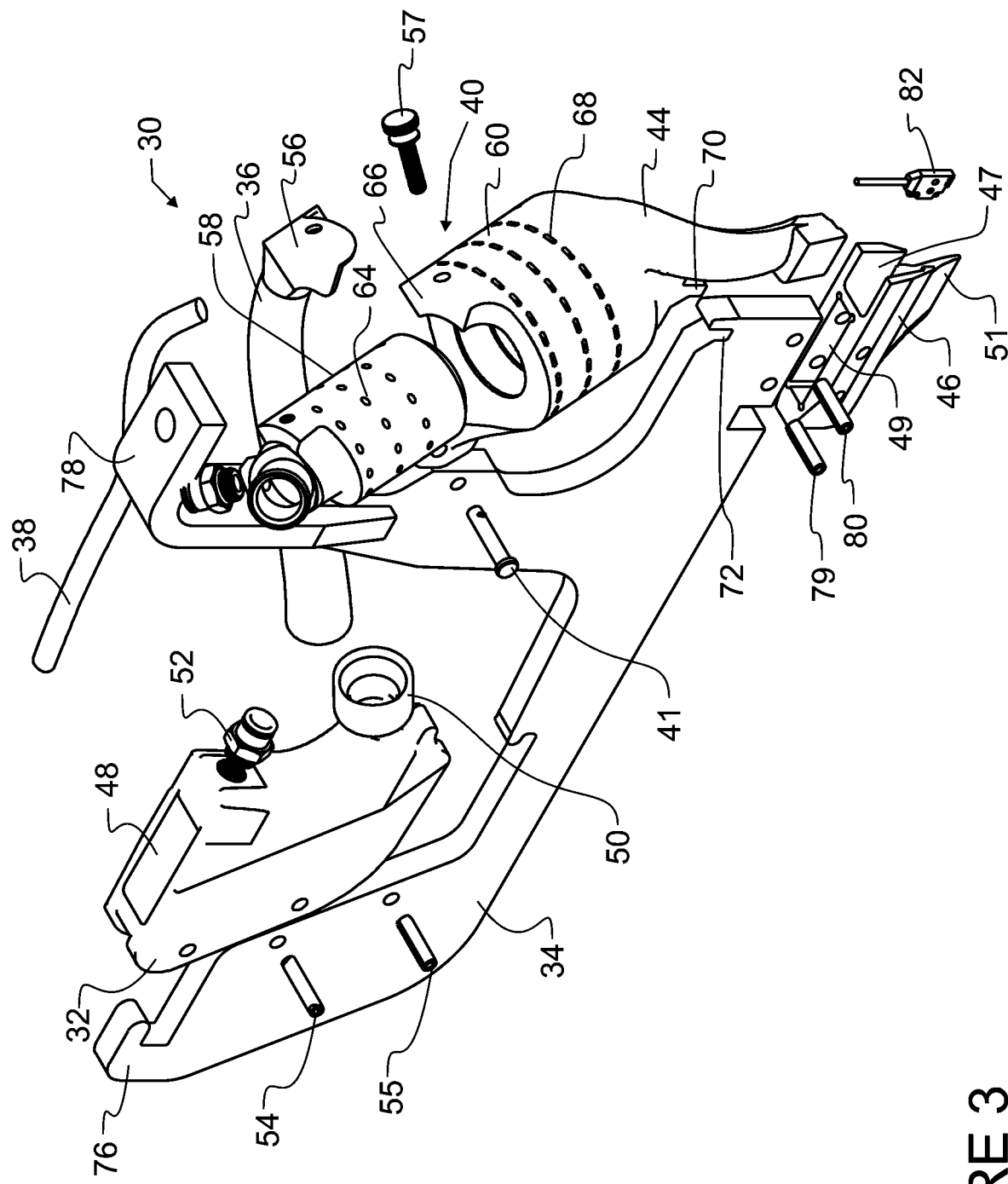
FIG. 3 is an exploded perspective view of the first embodiment of the seed orientation system.

FIGS. 2 and 3 depict the preferred embodiment seed orientation system 30. Seed orientation system 30 includes a seed collector 32 that directs seeds from seed tube 22 to seed orientation coil assembly 40 by way of seed transfer tube 36. Seed collector 32 includes a seed entrance aperture 48 and a seed exit aperture 50. Seed entrance aperture 48 is sized to mate with the seed tube 22. An air line connection 52 is disposed adjacent to the seed entrance aperture. The seed collector 32 may include various indentations or flanges for connection to the seed orientation support structure 34, as well as pins 54 and 55.

Seed transfer tube 36 attaches to seed exit aperture 50 at a first end and to seed orientation coil 40 at a second end. In preferred embodiment seed orientation system 30, seed transfer tube 36 will include a mating flange 56 and a retaining pin 57 best visible in FIG. 3 for connection to seed orientation coil 40. Pin 41 retains the seed orientation coil assembly 40 relative to support structure 34. Nevertheless, in alternative embodiments other suitable connections and couplings known in the mechanical arts will be used.

In preferred embodiment seed orientation system 30, seed orientation coil 40 includes an injector core 58 that resides within vented outer coil 60. The injector core 58 includes at a first end incoming air feed 42 and outgoing air feed 62 that provides air through air line 38 to air line connection 52 on the seed collector 32. Injector core 58 further includes at least one and as illustrated a plurality of nozzles 64 arrayed in a helical pattern about the outer face of the injector core 58.

In preferred embodiment seed orientation system 30, vented outer coil 60 includes a seed entrance 66 that mates with flange 56 of the seed transfer tube 36. A plurality of vents 68 are disposed about the outer face of the vented outer coil 60. The vents 68 may have a variety of shapes including rectangular, circular, ellipsoid or other shapes. The vents 68 do not have to be uniform in size or shape. For exemplary and non-limiting purpose, in some alternative embodiments outer coil 60 will be fabricated without exterior vents. In other alternative embodiments, vents 68 will comprise holes drilled with a laser, drill bit, chemical milling, or any other suitable technique. In yet other alternative embodiments, outer coil 60 will be fabricated from a porous, micro-porous, or otherwise gas-permeable material which provides venting throughout the exterior wall, including for exemplary and non-limiting purpose: a porous material including but not limited to a mesh or screen; sintered metals; porous carbon; porous carbon-graphite; porous carbon-silicates; open-cell foams of any suitable composition; and other breathable materials and compositions.

At a second end of the vented outer coil 60, seed exit path 44 extends towards the ground. A seed sensor 82 may be attached to the vented outer coil 60 proximal to the exit path 44 so as to monitor seed flow.

Seed orientation support structure 34 connects to row unit shank 16 through hook 76 and flange mount 78. It is envisioned that the geometry and location of such connection points can be altered depending on the structure of the row unit 10. The seed orientation support structure 34 supports seed orientation coil 40 through flange 70 which extends from the second end of vented outer coil 60. Flange 70 mates within notch 72 of the seed orientation support structure 34. Sub-furrow opener 46 is connected to the seed orientation support structure 34 by roll pins 79, 80.

Figure 4:
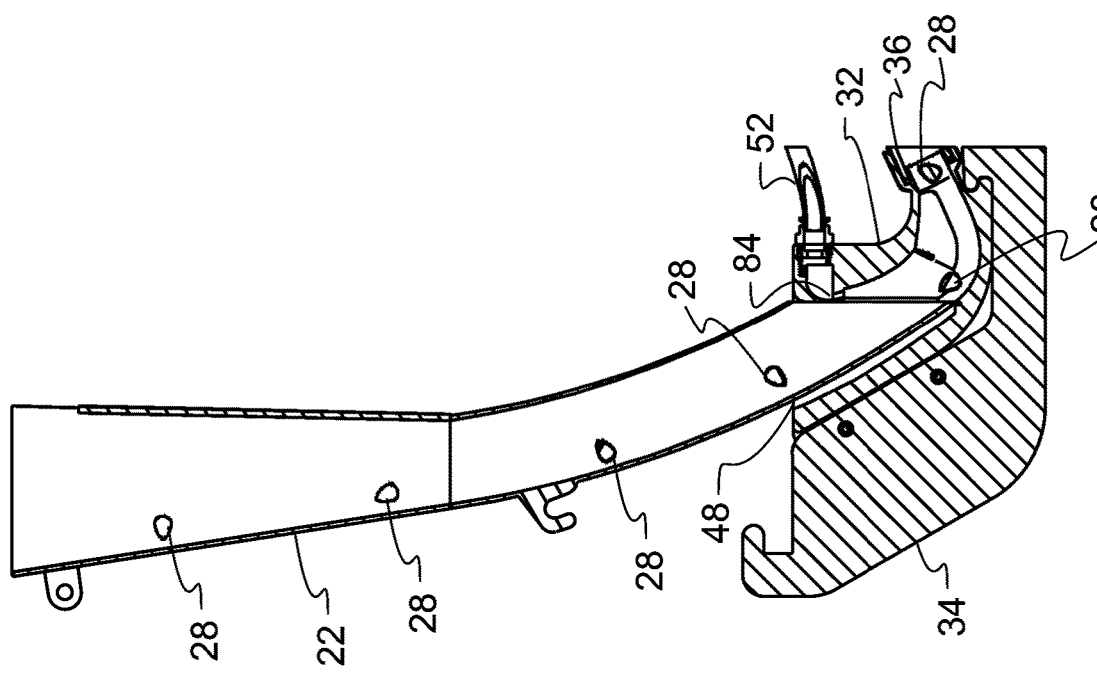
FIG. 4 is a cross-sectional view of the seed collector used in the first embodiment of the seed orientation system.

FIG. 4 depicts the intersection between seed tube 22 and seed transfer tube 36. Seed tube 22 is inserted through seed entrance aperture 48. Air line connection 52 is operably connected to an air blade nozzle 84 which directs air toward the seeds. Air blade nozzle 84 propels the seeds into seed transfer tube 36. Seeds exiting seed tube 22 are in a random orientation with a high rotational energy as they have fallen from seed meter 13 without any attempt at orientation.

Figure 7:
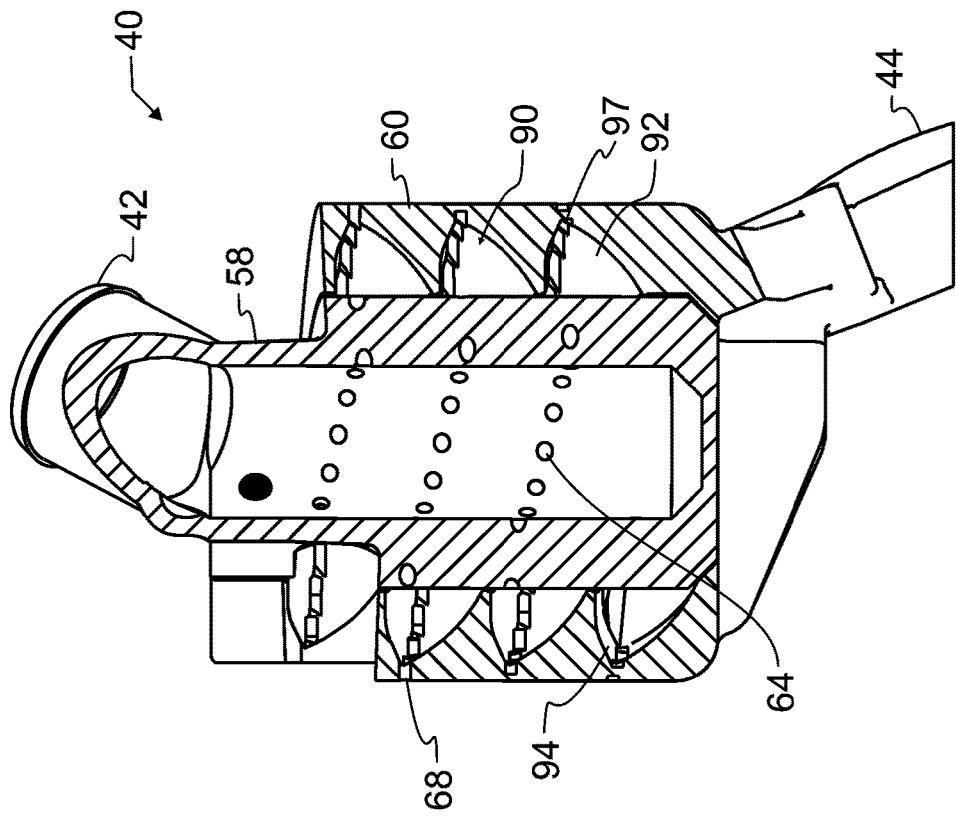
FIG. 7 is a cross-sectional view of the seed orientation coil assembly used in the first embodiment of the seed orientation system.
Figure 6A:
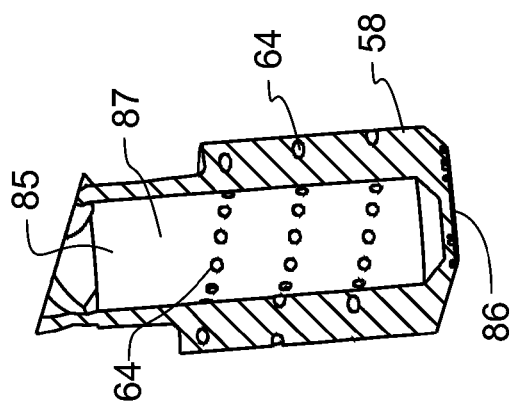
FIG. 6A is a cross-sectional view of an injector core taken along section line 6A' of FIG. 5.
Figure 6B:
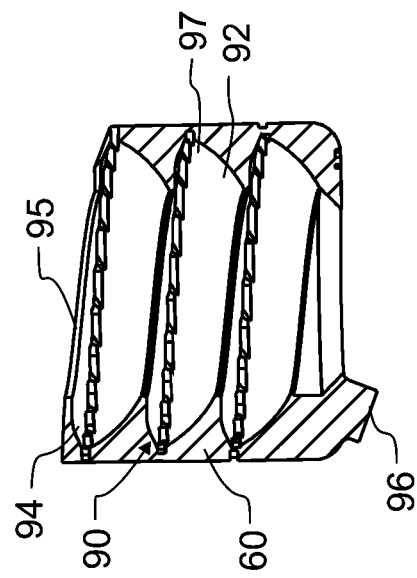
FIG. 6B is a cross-sectional view of a vented outer coil taken along section line 6B' of FIG. 5.
Figure 5:
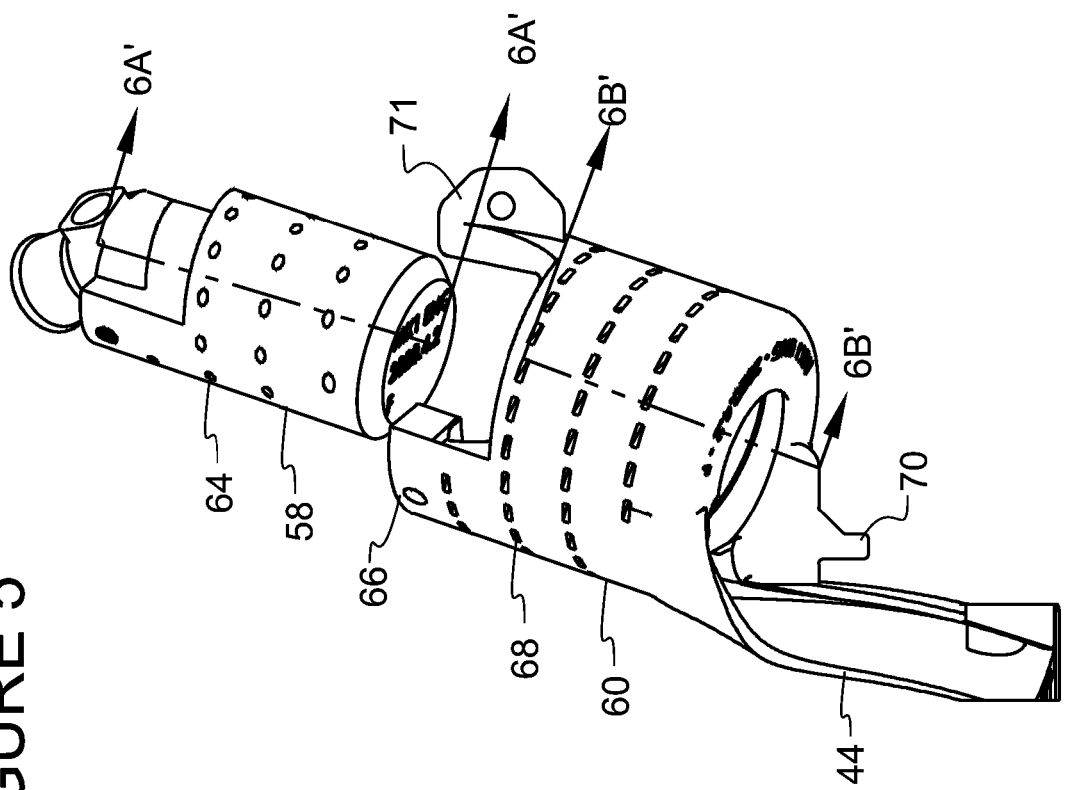
FIG. 5 is an exploded perspective view of the seed orientation coil assembly used in the first embodiment of the seed orientation system.

FIGS. 5 through 7 depict a first embodiment of the seed orientation coil assembly 40 in which random seed orientation is changed to an oriented tip down position. FIG. 5 illustrates an exploded view of the seed orientation coil assembly 40. FIG. 6A is a cross sectional view of the injector core 58 taken at section line B-B of FIG. 5. FIG. 6B is a cross sectional view of the vented outer coil 60 taken at section line A-A of FIG. 5. Injector core 58 is nested within vented outer coil 60. The vented outer coil 60 is attached to the seed orientation support structure 34 at flange 70 and mounting point 71.

Injector core 58 is generally cylindrical in shape with an air aperture 85 at a first end and a closed aft end 86. In alternative embodiments, the second end of the injector core will contain some additional venting. A plurality of nozzles 64 are shown in a helical pattern creating air passages between the central aperture 87 of the injector core and an interior of vented outer coil 60. In some manifestations, nozzles 64 are circular, but in other manifestations nozzles 64 will take at least one of a variety of shapes, placements and angles about injector core 58.

Vented outer coil 60 is generally cylindrical in shape with an open central aperture for insertion of the injector core 58. The exterior wall of vented outer coil 60 includes a plurality of vents 68 that create air passages. Vented outer coil 60 further includes seed entrance 66 that opens to helical pathway 90.

FIG. 6B illustrates the helical pathway 90 of vented outer coil 60. Helical pathway 90 includes seed riding surface 92 that intersects with seed guide wall 94. In some embodiments, seed riding surface 92 is curved so as to have a constant radius from seed entrance end 95 to aft end 96. In alternative embodiments, seed riding surface 92 is curved to have a radius that is selectively varied between seed entrance end 95 and aft end 96, resulting in sections or regions of wider radius and regions of tighter or smaller radius. Seed guide wall 94 intersects with seed riding surface 92 at ninety degrees to form a seed riding path 97. The plurality of vents 68 are generally disposed at the level of the seed riding path 97 on the seed riding surface 92. In the first embodiment the helical pathway 90 completes three revolutions about the injector core 58, though as already noted herein above more or fewer revolutions will be provided in alternative embodiments.

FIG. 7 illustrates by cross-sectional view the injector core 58 disposed within vented outer coil 60. In a first embodiment, the outer wall of injector coil 58 forms the inner barrier for helical pathway 90. As such, vented outer coil 60 does not require an inner wall or barrier. The helical pathway 90 terminates at seed orientation exit path 44.

Figure 9:
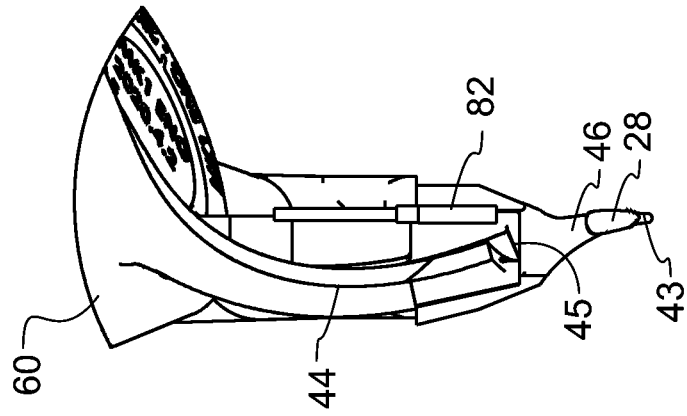
FIG. 9 is a detail view of the seed orientation system from FIG. 8.
Figure 8:
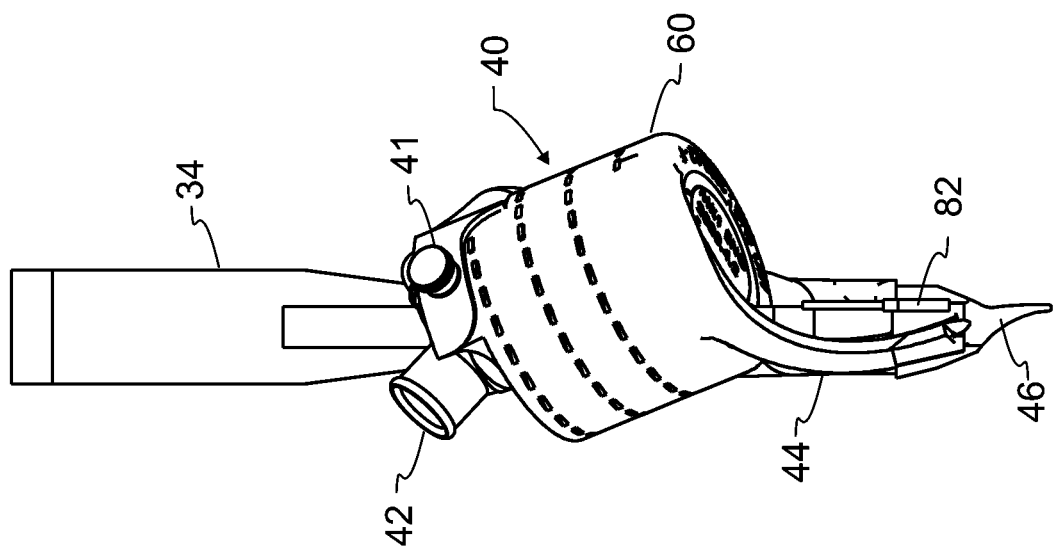
FIG. 8 is a rear elevational view of the seed orientation system.

FIGS. 8 and 9 illustrate the seed orientation exit path 44, seed exit point 45, and sub-furrow opener 46 which are part of the seed orientation coil assembly 40, with particular detail visible in FIG. 9. In addition, and as apparent from a comparison between FIGS. 8 and 9, FIG. 9 illustrates a corn seed 28 that is both airborne and immediately adjacent to the extension 43.

As best evidenced in FIGS. 2, 3, and 5-9, seed orientation exit path 44 is a non-disruptive continuation of helical pathway 90. Most desirably, this ensures that the seed 28 traverses from helical pathway 90 to seed orientation exit path 44 while the flat of the corn seed 28 stays firmly positioned against the exit wall without disturbing tip-forward orientation. In preferred embodiment seed orientation coil assembly 40, the curvature of helical pathway 90 transitions to a progressively larger radius into and along seed orientation exit path 44, thereby reducing centrifugal force applied to the seed 28. The centrifugal force is finally removed completely at seed exit point 45. Seed orientation exit path 44 also gently arcs through a rapidly increasing pitch ultimately to a downward direction of travel, thereby rotating the orientation of the longitudinal axis of the seed 28 to point the seed tip down and toward the furrow.

In preferred embodiment seed orientation coil assembly 40, the central helical axis is offset slightly from vertical. A generally vertical axis results in a relatively constant beneficial contribution from the force of gravity tending to hold the seed in stable sliding contact with helical pathway 90. Nevertheless, in alternative embodiments the central helical axis of preferred embodiment seed orientation coil assembly 40 is rotated from the primarily vertical orientation illustrated in the Figures to other orientations, including for exemplary and non-limiting purpose an orientation that in some alternative embodiments is completely horizontal. As may be appreciated, in such instances the geometry of seed orientation exit path 44 will also change, but will still be shaped to reduce and finally remove centrifugal force applied to the seed, while ensuring that the seed tip will point down and toward the furrow upon exit from seed orientation exit path 44.

As depicted in FIG. 3, sub furrow opener 46 may define an exit path aperture 47 that holds seed orientation exit path 44 and a support structure aperture 49 that allows for mounting the sub-furrow opener 46 to seed orientation support structure 34. Sub-furrow opener 46 also features an extended bottom slot or extension 43 that shapes the sub-furrow to prevent the seed tip from hitting the bottom of the sub-furrow and recoiling out, losing its orientation.

Seed sensor 82 is operably connected to the structure of the sub-furrow opener 46, and is disposed proximal to seed exit point 45. The purpose of seed sensor 82 is to make sure row unit 10 is actually planting seeds and, if not, to alert the person in the tractor that the row isn't planting. For exemplary and non-limiting purpose, seed sensor 82 might signal an alert because seed hopper 12 is out of seed, or seed is plugged in seed tube 22.

In preferred embodiment seed orientation coil assembly 40, as the seed 28 leaves seed orientation exit path 44 at seed exit point 45 it will be airborne for a short distance, maintaining its stable state. Seed orientation exit path 44 aims the seed 28 at a sub-furrow created by a sub-furrow opener 46. The sub-furrow opener 46 shapes walls into the soil that come into contact with the flat sides of the seed, wedging the seed 28 into the soil and thereby preserving seed orientation.

Sub-furrow opener 46 also has a blade 51 that is optionally but preferably swept back. This is to prevent clogs from soil entering up into the seed path when the planter is initially setting down into the soil. This can be achieved because the seed is shot backward at an angle, missing contact with blade 51. This swept back blade 51 also helps keep the sub-furrow walls from collapsing prematurely in loose soils. Collapsed walls would result in the seed bouncing and thereby losing orientation.

Desirably, a laminar airflow of greater velocity than the seed will continue to entrain the seed within seed orientation exit path 44 and onward through the air and into the furrow. Within the furrow, for exemplary purpose such as furrow 150 illustrated in FIG. 10, primary airflow will be deflected by the earth and so will primarily exit longitudinally within the furrow. However, the seed will preferably have sufficient inertia and momentum to separate from the primary airflow, subsequently wedging within the sub-furrow, for exemplary purposes such as trough 151 also illustrated in FIG. 10.

One of the serious shortcomings and challenges faced by the prior art that provides at least temporary orientation, such as incorporated by reference herein above, is maintaining orientation all the way into the earth and through the closing of the soil around and over the seed. While it may seem intuitive to extend a prior art seed tube down into the furrow, the prior art avoids such a geometry because a relatively small orifice feed tube required to maintain orientation will clog easily if so extended. Nevertheless, without a suitable airflow of substantially equal or greater velocity than the seed, the seed will almost instantly destabilize. If the airflow velocity drops below that of the seed, the aerodynamics that the present invention relies upon to orient the seed will essentially instantaneously flip the tip orientation of the seed. If this occurs suddenly and without stabilization, which is what happens to a seed being ejected from a prior art seed tube above the earth, the seed will essentially instantaneously tumble in the air, destroying any previous orientation. Even if the airflow velocity exiting the seed tube is approximately that of the seed, the air stream will degrade extremely quickly due to eddy currents and turbulence with the air surrounding the seed tube exit, still undesirably quickly dropping the airflow velocity and causing the seed to tumble.

In contrast to prior art seed tubes that must necessarily terminate above the furrow, in the present invention the seed orientation exit path 44 preferably extends all the way into the furrow. As a result, the air stream that leaves seed exit point 45 entrains the seed 28 through a very short travel distance measured by approximately the depth of the furrow before the seed separates therefrom. In consideration thereof, in some alternative embodiments of the present invention a seed alignment apparatus such as illustrated in the prior art incorporated by reference herein above but not limited solely thereto is provided in combination with the teachings of the present seed orientation exit path 44 and air entrainment, followed by detrainment in the furrow to provide seed orientation apparatuses.

While the close proximity of the seed exit point 45 to the sub-furrow is beneficial, this is not the sole benefit and novelty of the geometry and operation of the seed orientation exit path 44. In addition to proximity, locating the seed exit point 45 within the furrow also means that the furrow acts as a containment and guide for the air stream that, while not identical, is functionally similar to the containment of the air stream within helical pathway 90 or within an air-driven seed tube. Since the air stream is contained within and guided by the furrow, this also helps to maintain the air stream at a higher velocity while the seed is entrained solely therein. As the air stream passes close to the sub-furrow, and even partially therein, the air stream is necessarily deflected toward the closing wheels 20 by the generally vertical side walls of the furrow and sub-furrow and the sub-furrow opener 46. This means the air stream changes direction from a primarily vertical path through a sharp curve to a much more horizontal path. As the much lighter and lower mass air stream makes the sharp curve required by the geometry of the furrow and sub-furrow, momentum of the seed causes the seed to separate from the horizontally redirected air stream. Rather than making the sharp curve, the seed will instead keep moving vertically downward into the sub-furrow. Preferably, this separation from the air stream will occur as closely as possible to or even within the sub-furrow, so that seed inertia is sufficient to maintain the seed orientation entirely into wedging engagement with the sub-furrow.

While the corn seed 28 visible in FIG. 9 is both airborne and immediately adjacent to extension 43, as already described herein above, in some alternative embodiments the geometry of sub-furrow opener 46 is altered or additional material, objects, or features provided to extend further rearward, allowing the seed 28 to remain in contact therewith as the seed travels from seed exit point 45 into the sub-furrow. In these alternative embodiments, this provides an extended contact surface that creates at least a nominal amount of drag, further helping to ensure that the airflow maintains a greater or at least approximately equal velocity to that of the seed 28, thereby further helping to maintain aerodynamic orientation of the seed tip down. However, the benefits of incorporation of an extended contact surface must be weighed against the greater potential for contamination of the extended contact surface by mud and debris. Such contamination can in some instances and circumstances interfere with the final travel of the seed into the earth, and in interfering can also destroy proper seed orientation.

As illustrated, seed orientation exit path 44 terminates in a nearly vertical orientation. Nevertheless, in some alternative embodiments seed orientation exit path 44 is also swept or angled backward, imparting not only a vertical velocity component but also a horizontal velocity component. In these alternative embodiments the horizontal velocity component is selected to reduce the horizontal velocity delta of the seed versus the ground that the seed is coming into contact with. For exemplary and non-limiting purpose, at an exemplary 5 mph planting speed, the angle of the seed orientation exit path 44 in some alternative embodiments is selected to generate a 3 mph horizontal seed velocity component. In this example, the horizontal velocity delta is 2 mph. At a slower 3 mph planting speed, the seed would be propelled into the sub-furrow with a zero horizontal velocity delta between seed and sub-furrow.

While the seed orientation exit path 44 will in some alternative embodiments be swept or angled backward to impart a horizontal velocity component, the actual attained horizontal velocity component will vary depending upon the actual exit speed of the seed, in turn controlled significantly by overall system air availability and pressure. In addition, and as will be apparent to those reasonably skilled in the art, changing the angle of the exit path will also alter the overall seed orientation when the seed is wedged into the soil. Consequently, the selection of an exit path angle will be made with appropriate consideration for both of the acceptable target seed orientation and seed-to-ground velocity differential.

The angle of the seed orientation exit path 44 in some alternative embodiments also or alternatively will be varied to provide finer control of seed orientation. For exemplary and non-limiting purpose, in some alternative embodiments adjustment of the angle of seed orientation exit path 44 is used to compensate for any action or effect of the closing wheel that might cause the already deposited seed to rotate about an axis transverse to the row during the closing of the soil about the seed. Nevertheless, in most embodiments and applications the sub-furrow is inconsequentially disturbed during the closing process, meaning the orientation of the seed in most situations will not change.

Various embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 11:
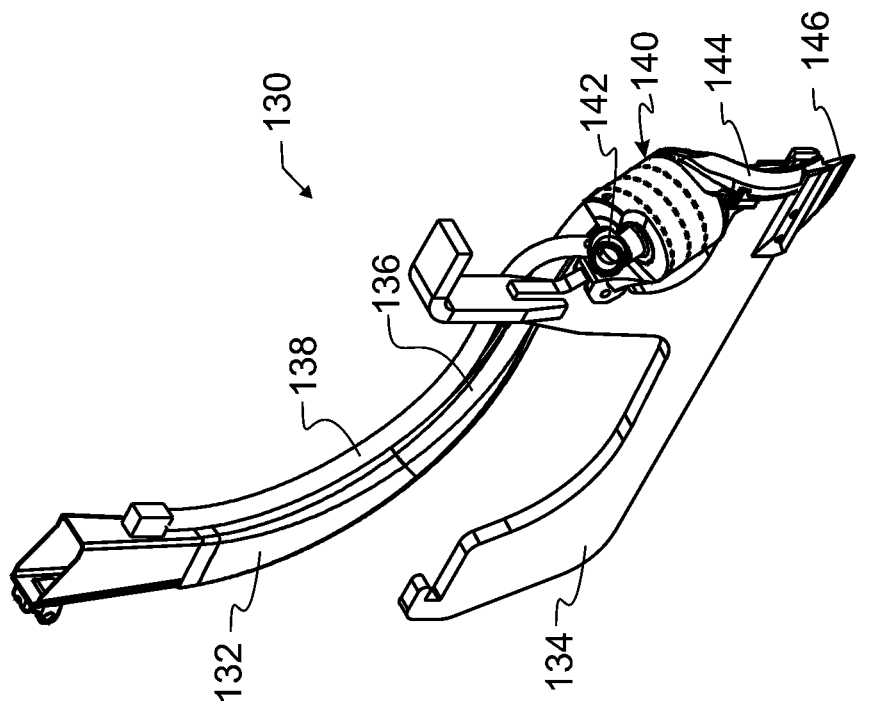
FIG. 11 is a perspective view of the alternate embodiment seed collector.
Figure 10:
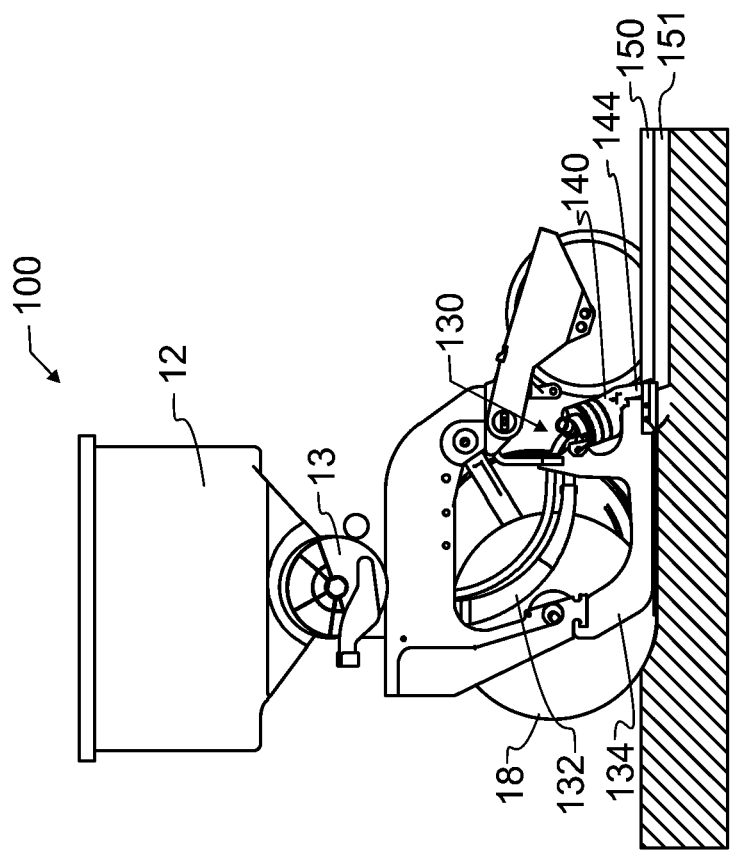
FIG. 10 is a side elevational view of a planter row unit with an alternate embodiment seed collector.

FIGS. 10 and 11 illustrate an alternative embodiment seed collector design wherein seed tube 22 is removed, and seed orientation system 130 is directly connected to seed meter 13. The seed orientation system 130 is mounted to row unit 100. Seed orientation system 130 includes a seed collector 132 operably attached to seed meter 113. Seed collector 132 gathers the seed, which then travels by way of a seed transfer tube 136 to a seed orientation coil assembly 140. The seed passes through the helical path of the seed orientation coil assembly 140 to an oriented seed exit path 144. A sub-furrow opener 146 creates a wedge-shaped trough within the furrow for capturing the oriented seed. The opener blade 18 creates a furrow 150 and the sub-furrow opener 146 creates a trough 151 within the furrow 150.

Movement of the seed throughout seed orientation system 130 is aided by air from a central blower/fan. Air is first directed to system air infeed 142 disposed on the upper face of seed orientation coil assembly 140. An air line 138 is then directed to seed collector 132 for moving the seed from seed collector 132 to seed orientation coil assembly 140. The seed collector 132 catches seeds directly from seed meter 13 and preferably gently transports the seed under air power in the most direct and efficient path possible to seed orientation coil assembly 140. This configuration improves seed spacing and minimizes seed tumbling. A seed orientation support structure 134 provides structural support for seed orientation coil 130 and sub-furrow opener 146.

In operation, seed orientation systems 30, 130 deliver seeds from a row unit 10 to the ground in an optimal growing orientation. Seeds are placed in seed hopper 12. The seed hopper 12 includes an opening to direct the seed to a seed meter 13. The seed meter 13 then attempts to singulate the seed and spaces the seed out for delivery into the ground. Seed orientation systems 30, 130 either collect the seed from seed tube 22 or from a seed collector 132 that replaces the seed tube 22.

A high-flow pressurized air system propels the seed from seed collector 32, 132 through a seed transfer tube 36, 136 to the seed orientation coil assembly 40, 140. A major factor in seed stability is catching/collecting the seed as gently as possible from seed meter 13. The seed ideally slides gently rather than tumbling into the seed orientation coil assembly 40, 140. This may be achieved by a very gentle and gradual collector path 132 from seed meter 13 to seed orientation coil assembly 40, 140 to reduce acute angle impacts resulting in tumbling. A seed that is tumbling upon entering the orientation coil may continue to tumble through the entire coil, which can result in both the seed not being properly oriented when planted and the seed not being properly spaced.

The seed enters into vented outer coil 60 of the seed orientation coil assembly 40, 140, with the vented outer coil 60 defining a helical pathway 90 to a seed exit path 44, 144. The vented outer coil 60 includes a plurality of air vents 68 disposed about and extending radially through an outer wall of vented outer coil 60.

Pressurized air is injected into injector core 58 of the seed orientation coil assembly 40, 140. As already described herein above, injector core 58 includes a plurality of air injectors or nozzles 64 disposed about and extending radially through the outer wall of the injector core 58. The nozzles 64 direct a focused air stream onto helical pathway 90 of vented outer coil 60.

Figure 12:
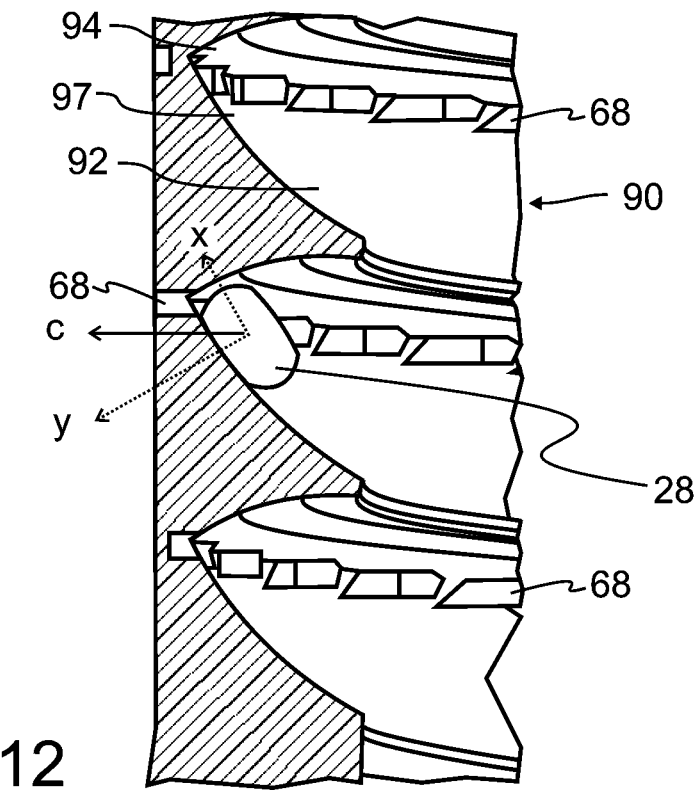
FIG. 12 is a cross-sectional view of the vented outer coil illustrating the position of a seed and the representative centrifugal forces on the seed.
Figure 13:
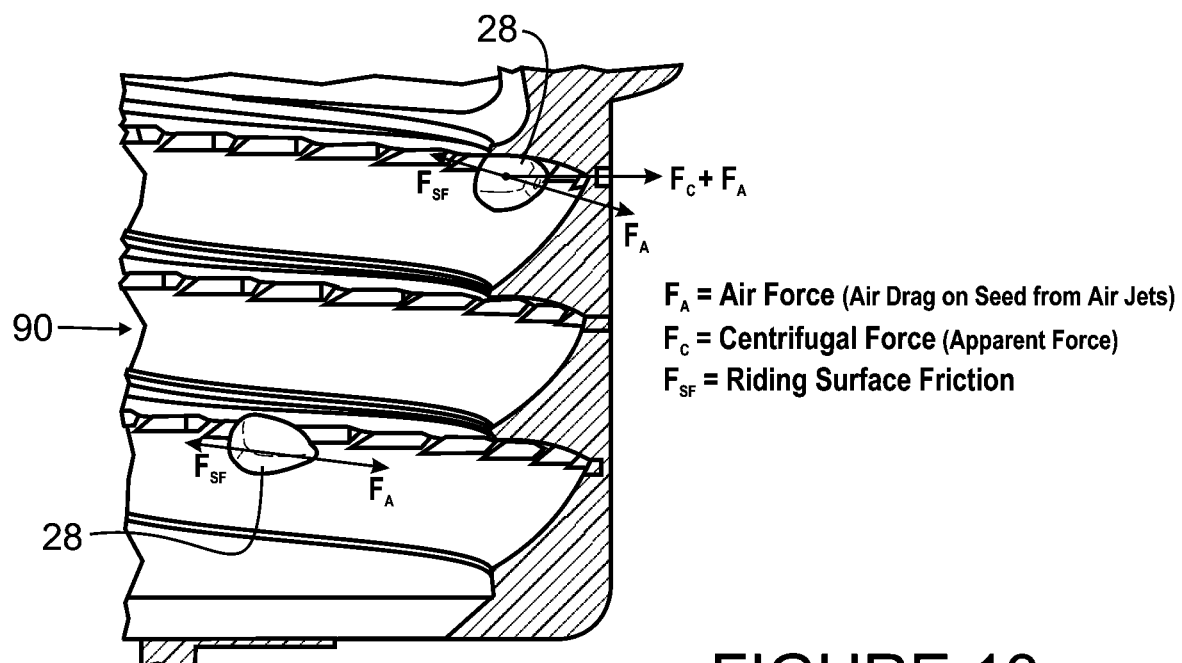
FIG. 13 is a cross-sectional view of the vented outer coil illustrating the position of seeds and the representative aerodynamic and other forces.
Figure 14:
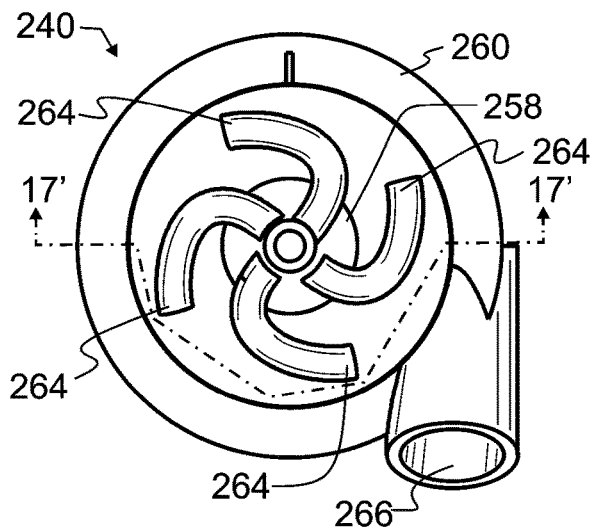
FIGS. 14-17 illustrate a first alternative embodiment seed orientation coil assembly from top, bottom and front side projected, top and side projected, and sectional views, respectively, the sectional view of FIG. 17 taken along section line 17' shown in FIG. 14.
Figure 15:
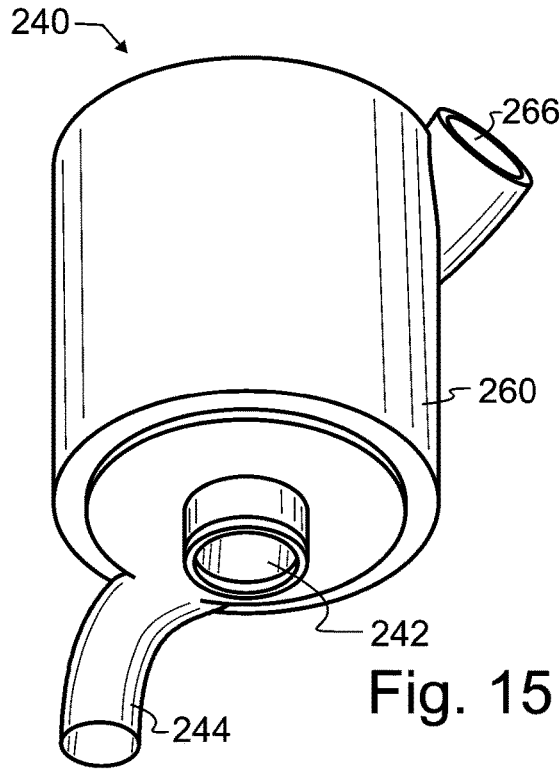
Figure 16:
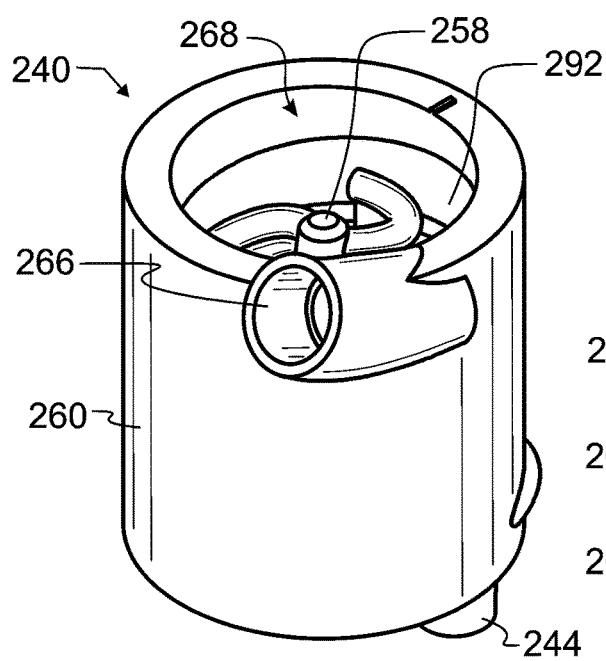
Figure 17:
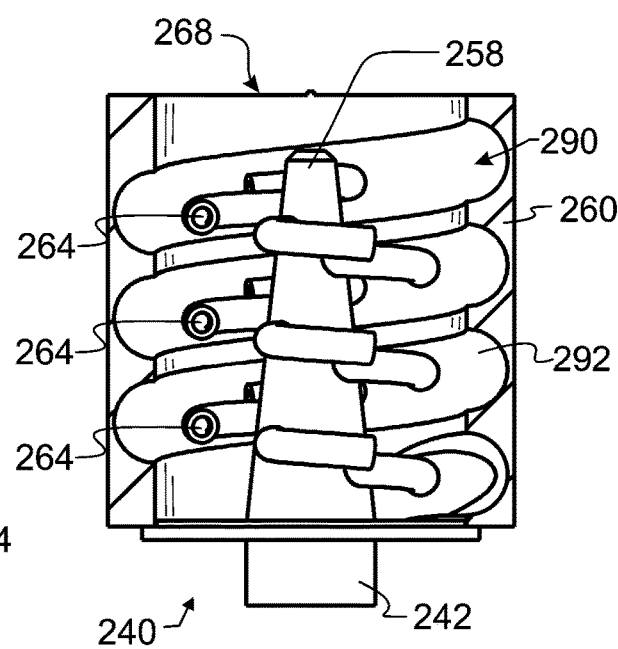

Seed enters helical pathway 90 in a random orientation. Airflow through injector core 58 and outer coil 60 in combination with centrifugal force drives the seed up the seed riding surface 92 to seed guide wall 94. As illustrated in FIGS. 12 and 13, a centrifugal force is induced on the seed 28 as it travels its curved/helical pathway 90. The airflow from injector nozzles 64 hits the seed 28 at an angle, giving two main (pressure) force vector components on the seed 28. One component pushes parallel to seed riding surface 92 and the other pushes perpendicular thereto. The parallel component of the airflow flows from behind the seed 28 and over the seed 28. This both propels the seed 28 forward and causes the seed 28 to orient tip forward in the flow, as this orientation has the most stable aerodynamic cross section or lowest air drag. This parallel airflow component preferably increases the velocity of the seed 28 sufficiently to make soil capture possible. The parallel airflow may be a combination of the airflow generated by seed meter 13 and the air flow directed to seed transfer tube 36. The perpendicular component of the airflow, combined with centrifugal force, simultaneously pushes the seed 28 into both seed riding surface 92 and seed guide wall 94, thereby defining seed riding path 97 and providing the stability needed to maintain tip-forward orientation. Preferably the major component of riding surface friction $F_{SF}$ will be derived from seed riding surface 92, and only a minor component of riding surface friction $F_{SF}$ will be derived from seed guide wall 94.

After the seed is oriented it is necessary to stabilize the position of the seed all the way to the ground. There are a number of techniques described in the patents incorporated by reference herein above that orient a seed. Unfortunately, the patents incorporated by reference herein above also observe that there is a tendency for the seed to reorient and thereby lose the preferred orientation, in some cases tumbling out of control. The present inventors have recognized that this strong tendency to lose proper orientation is due primarily to the general shape of the seed.

To keep the seed stable after initial orientation, the present invention provides several features and techniques. In order to maintain position of the seed, a low friction surface for the helical path 90 is preferred. A low friction, low roughness, and/or lubricious surface reduces any tumbling of the seed as the seed will not "dig in" or "catch" on the surface. Instead, the greater velocity air stream will induce the seed to slide while maintaining an oriented position. An energy absorbing surface is also beneficial for it will "deaden" or partially absorb seed impact energy during tumbling, thereby favoring the seed to ride instead of rolling and/or tumbling, and as a consequence encouraging a properly oriented position. The path from the seed meter 13 to the orientation coil 40, 140 also benefits from the properties listed above for the orientation coil riding surface 90.

A curved path also acts to maintain the seed orientation by generating a centrifugal force. The centrifugal force acts on the seed to drive the seed into the surface, which stabilizes and reduces bouncing and tumbling, and thereby helps to retain an oriented position. The curved shape of the riding surface 92 profile will also help align the seed longitudinally along the seed path, which aids in the orientation process.

In addition to helical pathway 90, a riding surface 92 shape/profile that includes a guide wall 94 will, when properly tuned, more precisely locate, stabilize, and maintain the orientation of an oriented seed. When seed orientation coil assembly 40 is well tuned, a seed traversing riding surface 92 will only gently climb the banked curve defined by riding surface 92 profile and will only lightly come into sliding contact with guide wall 94. A gentle sliding contact with guide wall 94 will allow seed 28 to pivot sufficiently to bring a minor side face of seed 28 into adjacent and parallel contact with guide wall 94. This alignment of the major seed face in sliding contact with riding surface 92 and the minor and generally perpendicular side face in sliding contact with guide wall 94 creates a very stable alignment of seed 28 within helical pathway 90 that can readily be carried through to seed exit point 45. If for any reason seed 28 again slides away from sliding contact with guide wall 94 during traversal of helical pathway 90, most preferably conditions within helical pathway 90 will be appropriate to again bring the minor side face of seed 28 gently back into sliding contact with guide wall 94.

In contrast, a strong and sudden impact of seed 28 with guide wall 94 can commonly result in a bouncing and tumbling effect, thereby tending to destroy the alignment of seed 28 within helical pathway 90. As discussed elsewhere herein, such bouncing and tumbling may be irrecoverable, resulting in a seed bouncing through the remaining portion of helical pathway 90. Such irrecoverable bouncing and tumbling not only destroys seed orientation, but can also significantly and detrimentally alter seed spacing.

The characteristics of seed orientation coil assembly 40 that can be controlled or varied with appropriate design and geometry of injector core 58 and outer coil 60 to tune or optimize performance include but are not limited to: the radius of curvature of helical seed pathway 90 and the number of turns; rate of change of the radius of curvature of helical seed pathway 90; the extent of banking; the seed velocity along seed riding surface 92; change in direction of seed riding surface 92 along one or multiple axes; the extent of the contact surface area, surface finish, and coefficients of friction; the extent and geometry of nozzles 64 and vents 68; the air pressure provided to nozzles 64; and the angle of the injector airflow.

Inserting injector core 58 into outer coil 60 provides a combination of benefits, including but not limited to: easier fabrication; better access for cleaning and servicing; and an ability for a farm worker, factory, or any other involved person at virtually any time to selectively control operational parameters associated with seed orientation by selection and installation of a suitably designed and fabricated one or both of injector core 58 and outer coil 60. Again only for exemplary and non-limiting purpose, by selecting one of an assortment of pre-fabricated injector cores 58 and outer coils 60, an operator or farm worker may quickly and economically control or tune the operation of preferred embodiment seed orientation system 30 to better suit the seed, planting conditions, and other factors of the day or moment.

While inserting injector core 58 within outer coil 60 is most preferred, in some alternative embodiments injector core 58 and outer coil 60 will be a single unitary component, and in other alternative embodiments injector core 58 and outer coil 60 will comprise more than two distinct components. Such decisions will be made by a system designer of reasonable skill based upon specific design objectives and will be readily understood from a reading of the present disclosure.

After being oriented in seed orientation coil assembly 40, 140, the seed 28 is then directed to seed exit path 44, 144 and then into a scored sub-furrow 151 inside a main furrow 150 that is used to capture or wedge the seed to retain its orientation and/or position. The seed orientation can be captured/preserved if the seed is propelled into an interference fit sub-furrow in the soil that the seed wedges into. In addition to maintaining proper seed orientation, wedging the seed into firm contact with moist soil around both major faces of the seed will also reduce germination time, render germination times more consistent across a field, and improve germination rates. A very important benefit of the present invention is this increase in consistency of germination time. Agronomists have noted that a very slow-to-germinate seed in effect becomes a super weed, because it is not killed by herbicides, and yet if it germinates late, it will not yield any corn and will instead compete with corn-producing plants for sunlight and nutrients. Delays in germination can be caused by air pockets around or against the seed, or by improper orientation, both addressed by preferred embodiments of the present invention.

The sub-furrow profile preferably needs to taper down to allow seeds of all sizes to be captured. The profile preferably will also have an extended bottom to allow the seed to become wedged or friction fit rather than the seed tip hitting the bottom of the sub-furrow and recoiling out.

Many of the discussions of preferred and alternative embodiments in the present specification describe the specific combination of a furrow and a sub-furrow. This is a preferred combination, since opener blade 18 helps to protect sub-furrow opener 46, 146 should there be a rock or other obstacle in the earth that might otherwise damage the sub-furrow opener. Nevertheless, in alternative embodiments a single furrow is produced that already includes a wedge-shaped cross-section at the bottom of the furrow, of like geometry to the furrow and sub-furrow combination produced by opener blade 18 in combination with preferred sub-furrow opener 46, 146.

Owing to the construction of seed orientation system 30, even in the event of a failure to orient a seed preferred embodiments of the present invention will continue to plant such unoriented seeds without interfering with the ordinary operation of row unit 10. Consequently, preferred embodiments of the present invention have been designed to offer substantial benefit in planting with minimal risk.

FIGS. 14-17 illustrate a first alternative embodiment seed orientation coil assembly 240. Air from a central blower/fan is coupled through any suitable coupler to a central system air infeed 242, where the pressurized air enters seed orientation coil assembly 240. The air enters a central injector core 258 of any suitable geometry, which acts to distribute the air to one or more air injector nozzles 264. As best evident in FIG. 17, these air injector nozzles 264 are directed at helical pathway 290, which is defined by a trough or other suitable geometry formed into vented outer coil 260. Some portion of the pressurized air jet released from each air injector nozzles 264 will follow within helical pathway 290, and will also be exposed to centrifugal force as the air stream contacts helical pathway 290. As a result, this air stream will interact with any seed 28 traveling along seed riding surface 292. In first alternative embodiment seed orientation coil assembly 240, the upper inner region is open to the atmosphere through vent 268. Consequently, some of the air traveling in the direction of helical pathway 290 but relatively more interior therefrom will peel away and travel out of vent 268. The result in some embodiments is that the highest velocity air stream will travel within helical pathway 290 very near to riding surface 292. In such embodiments, there will be a reduced lifting of the seed away from riding surface 292.

While as illustrated vent 268 is simply an open top, in some embodiments one of any variety of protective and air permeable coverings or closures will be used. Such air permeable coverings, for exemplary and non-limiting purpose, may comprise screening, mesh, micro-porous materials and compositions, a cap with at least one small gap or covered opening, or any other suitable or equivalent apparatus.

Seed 28 enters helical pathway 290 through seed entrance 266 where the seed is exposed to a combination of air force, centrifugal force, and riding surface friction as described with regard to FIG. 13 herein above. This combination of forces orients seed traveling through first alternative embodiment seed orientation coil assembly 240. After being oriented in first alternative embodiment seed orientation coil assembly 240, the seed is then directed to oriented seed exit path 244 and subsequently planted in the same manner as described herein above for the previous embodiments.

Figure 18:
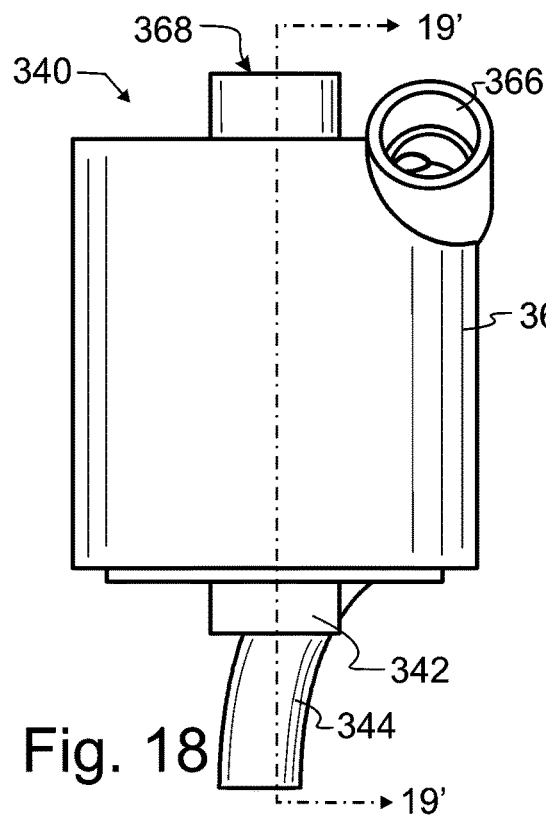
FIGS. 18-19 illustrate a second alternative embodiment seed orientation coil assembly from front elevational and sectional views, respectively, the sectional view of FIG. 19 taken along section line 19' shown in FIG. 18.
Figure 19:
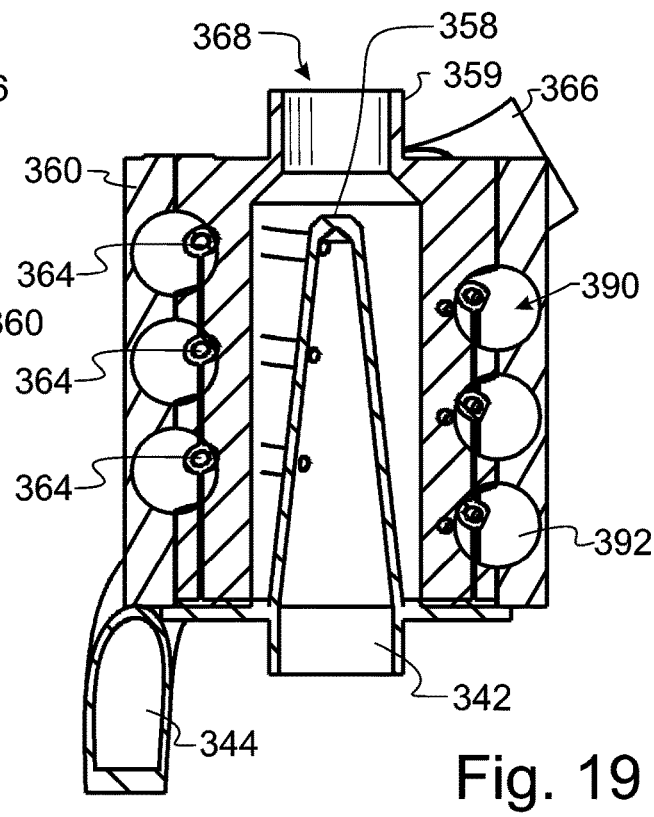

FIGS. 18-19 illustrate a second alternative embodiment seed orientation coil assembly 340 that closely resembles first alternative embodiment seed orientation coil assembly 240. In consideration thereof, most of the components will be understood to be identical or substantially similar. However, second alternative embodiment seed orientation coil assembly 340 also includes an injector core outer wall 359 that at least partially encloses helical pathway 390. As illustrated in FIG. 19, injector core outer wall 359 fully encloses helical pathway 390, and in such instance will most preferably be air permeable, for exemplary and non-limiting purpose comprising micro-porous materials and compositions, one or more internally directed vent holes similar to vents 68, small gaps, or any other suitable or equivalent apparatus. The inclusion of injector core outer wall 359 can therefore be used to alleviate the need for any dust covers or other protective apparatus.

Figure 20:
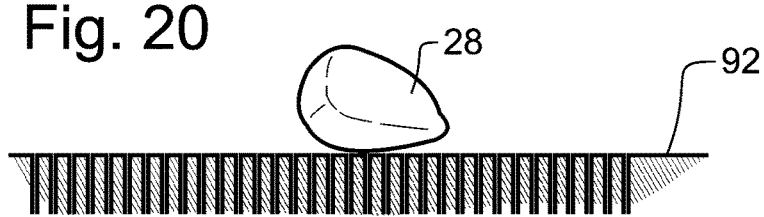
FIGS. 20-22 illustrate first, second, and third alternative embodiment seed riding surfaces from side sectional view.
Figure 21:
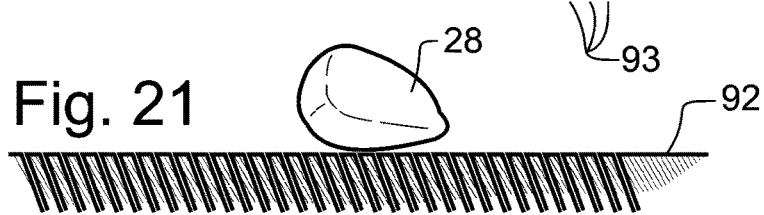
Figure 22:
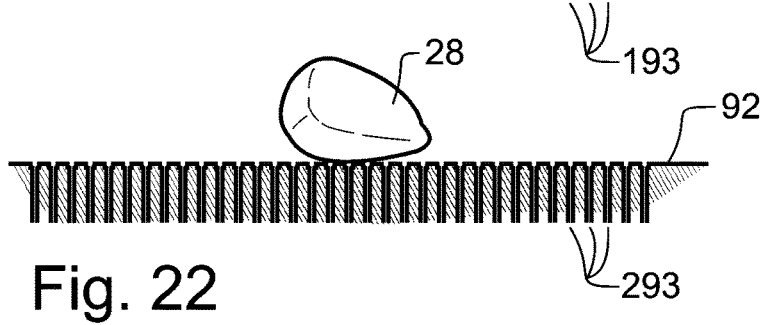

FIGS. 20-22 illustrate a large plurality of first, second, and third alternative embodiment air jets 93, 193, 293 applied to seed riding surface 92. As described herein above, seed riding surface 92 preferably comprises a low friction, low roughness, and/or lubricious surface that reduces any tumbling of the seed. Instead, the greater velocity air stream will induce the seed to slide before tumbling or lifting, thereby maintaining an oriented position. While materials selection and surface finish can reduce surface friction, in the illustrations of FIGS. 20-22 the first, second, and third alternative embodiment air jets 93, 193, 293 are applied to seed riding surface 92 to obtain similar benefit. A large number of relatively low volume air jets 93, 193, 293 are provided with a pressure differential that moves air to and exiting from seed riding surface 92 to reduce the riding surface friction $F_{SF}$. Air jets 93 comprise generally cylindrical conduits extending perpendicular to seed riding surface 92, while air jets 193 illustrate the option in some alternative embodiments to vary the angular orientation of the conduits relative to seed riding surface 92.

Figure 23:
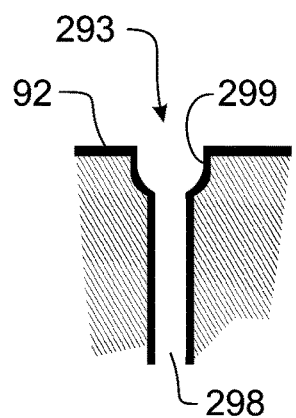
FIG. 23 illustrates a single seed riding surface air jet of FIG. 22 from an enlarged view.
Figure 24:
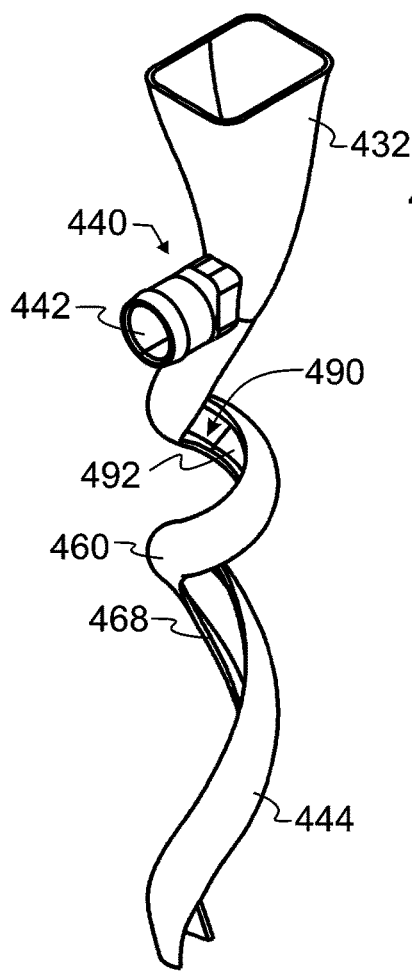
FIGS. 24-28 illustrate a third alternative embodiment seed orientation coil assembly from projected, side elevational, top, bottom, and sectional views, respectively, the sectional view of FIG. 28 taken along section line 28' shown in FIG. 27.
Figure 25:
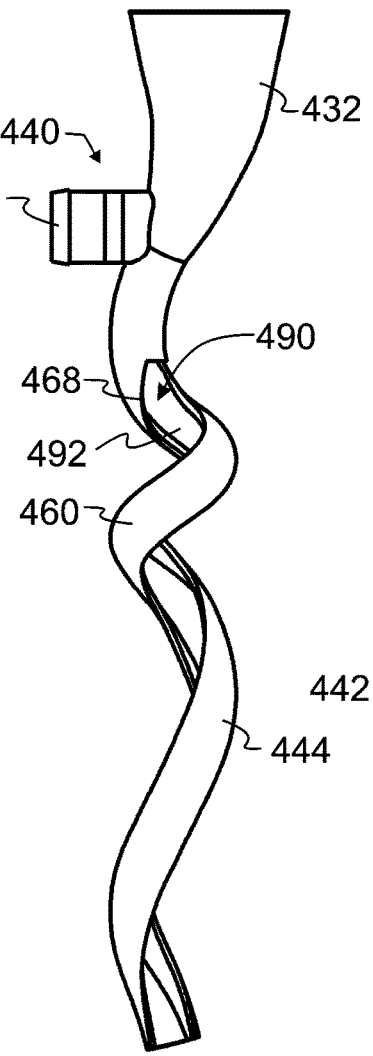
Figure 28:
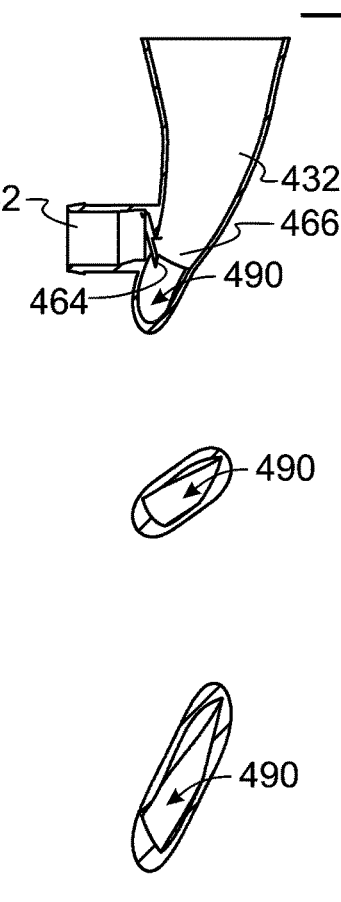
Figure 26:
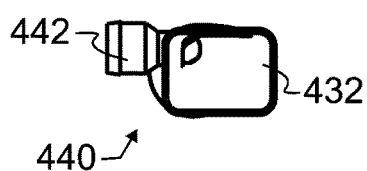
Figure 27:
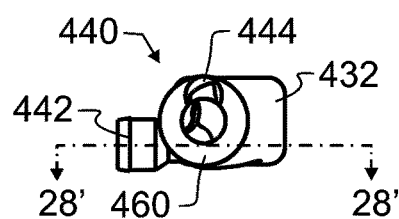

FIG. 23 illustrates a single seed riding surface air jet of FIG. 22 from an enlarged view. As evident therefrom, seed riding surface air jets 293 may in some embodiments be provided with additional geometry designed to control the flow and swirl of air for particular desired effect. As visible therein, generally cylindrical air jet conduit 298 ends prior to seed riding surface 92, with the air flow instead being conveyed through an air swirl and flow shaping orifice 299 of any suitable geometry. For exemplary and non-limiting purpose, an air swirl and flow shaping orifice 299 in some embodiments is configured to generate an eddy-type swirl similar to that created by dimples in a golf ball, though other geometries will be recognized by those skilled in the art of nozzles to obtain desired air flow adjacent to surface 92 and seed 28.

FIGS. 24-28 illustrate a third alternative embodiment seed orientation coil assembly 440 including an integral seed collector 432. System air infeed 442 drives air through air injector nozzle 464 into helical pathway 490. In the region adjacent to system air infeed 442, helical pathway 490 is fully enclosed and unvented. However, shortly thereafter vented outer coil 460 is provided with an open interior vent 468, which may be entirely open as illustrated, or which in alternative embodiments is covered by an air-permeable surface. Vented outer coil 460 may comprise any number of degrees of rotation, though as illustrated by approximately a single 360 degree rotation. The relatively small diameter helps to increase the centrifugal force Fc described in association with FIG. 13. After passing through vented outer coil 460, seed will then pass into and through oriented seed exit path 444 which functions in the manner already described herein above. This third alternative embodiment seed orientation coil assembly 440 illustrates a combination of a single air injector nozzle 464, greater centrifugal force generation, shorter overall seed path length from seed collector 432 to oriented seed exit path 444, and a single long interior vent 468.

In some alternative embodiments, system air infeed 442 is positioned lower along helical pathway 490, intermediate between the position illustrated in the Figures and the aft end of oriented seed exit path 444. In such embodiments, seed entering into third alternative embodiment seed orientation coil assembly 440 will most preferably be delivered with appropriate velocity to traverse seed riding path 492 and, where provided, gently engage with a seed guide wall similar to and designed in accord with the teachings of seed guide wall 94.

While only the seed orientation coil assemblies 40, 140 are illustrated as having a seed guide wall 94, it will be understood herein that a guide wall will be provided in some alternative embodiments to the seed orientation coil assemblies 240, 340, 440 as well. Further, and as already noted with regard to seed orientation coil assemblies 40, 140, seed riding surfaces 292, 392, 492 may be curved, planar, or of other suitable geometry in profile, and the characteristics of the seed orientation coil assemblies can be controlled or varied with appropriate design and geometry of injector core and outer coil including but not limited to: the diameter of helical seed pathway and the number of turns; the extent of banking, also described herein as the angle of the radially outward slope of the seed riding surface 92 profile; the seed velocity along seed riding surface; the extent of the contact surface area, surface finish, coefficients of friction including in some embodiments different coefficients of friction between seed riding surface and seed guide wall, the extent and volume and pressure of seed riding surface air jets such as 93, 193, 293, and venting; the extent and geometry of air injector nozzles such as air injector nozzles 64 and vents such as vents 68, 268, 368, 468; the air pressure provided to air injector nozzles 64; and the angle of injector airflow.

The terminology used herein is for the purpose of describing particular embodiments only and is not intended to be limiting of the invention. As used herein, the term "and/or" includes any and all combinations of one or more of the associated listed items. As used herein, the singular forms "a,", "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence of or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

While the foregoing details what is felt to be the preferred embodiment of the invention, no material limitations to the scope of the claimed invention are intended. Further, features and design alternatives that would be obvious to one of ordinary skill in the art are considered to be incorporated herein. While each of the embodiments illustrated herein are necessarily fixed to a single combination of features, those skilled in the art will understand how to selectively include varieties of the features different from those illustrated, or, said another way, upon reading the present disclosure it will be apparent to select particular features from different ones of the illustrated embodiments for the creation of a new embodiment in accord with the teachings of the present invention. The scope of the invention is set forth and particularly described in the claims herein below.

We claim:

1. A seed orientation system for delivering oriented seed to a bottom of a furrow, the seed orientation system comprising:
    a seed orientation assembly including a seed entry aperture connected to an agricultural planting machine that is configured to receive seed therefrom, and further including a seed riding surface upon which the seed travels and is aligned relative to the seed riding surface;
    an oriented seed exit path receiving the aligned seed from said seed riding surface, the oriented seed exit path discharging the aligned seed into an air space adjacent to the furrow; and
    an air stream passing through said oriented seed exit path at a velocity greater than a velocity of the aligned seed, said air stream entraining the aligned seed, said air stream exiting said oriented seed exit path and passing into said air space in a direction offset from parallel to a longitudinal axis of the furrow, whereupon the aligned seed is detrained from said air stream and is delivered into the bottom of the furrow oriented tip down, and with a major surface of the seed facing a sidewall of the furrow.

2. The seed orientation system of claim 1, wherein said furrow includes a pair of sidewalls defining a wedge shaped cross-section, and wherein the seed comprises corn having a pair of opposed major surfaces, the opposed major surfaces being substantially co-planar with said pair of sidewalls when the seed is delivered into the bottom of the furrow.

3. The seed orientation system of claim 1, further comprising a sub-furrow opener disposed adjacent to said oriented seed exit path, said sub-furrow opener including a wedge configured to slice a sub-furrow within said furrow, said sub-furrow having a pair of sidewalls defining a wedge shaped cross-section, and wherein the seed comprises corn having a pair of opposed major surfaces, the opposed major surfaces being substantially co-planar with said pair of sidewalls when said seed is delivered into said sub-furrow.

4. The seed orientation system of claim 1, wherein said seed riding surface upon which said seed travels and is aligned comprises a helix.

5. The seed orientation system of claim 1, wherein said seed riding surface upon which said seed travels and is aligned comprises a curve.

6. The seed orientation system of claim 1, wherein said air stream passing into said air space maintains a velocity at least equal to said aligned seed.

7. The seed orientation system of claim 6, wherein said air stream passing into said air space maintains a velocity greater than said aligned seed.

8. The seed orientation system of claim 7 wherein said oriented seed exit path discharges the seed into said air space.

9. The seed orientation system of claim 1, wherein said oriented seed exit path comprises a continuation of said seed riding surface and wherein said oriented seed exit path maintains alignment of said aligned seed as received from said seed riding surface.

10. The seed orientation system of claim 9 wherein said seed riding surface induces a centrifugal force to said seed, and said oriented seed exit path progressively reduces and removes said centrifugal force induced to said seed as said seed traverses said oriented seed exit path.

11. A method of planting a seed in an orientated position within a seed row in the earth said method comprising:
- transferring said seed from a seed hopper to a seed orientation coil assembly, said seed orientation coil assembly including a seed path;
- directing said seed onto said seed path;
- injecting an air flow into said seed path, said air flow propelling said seed through said seed path and inducing a centrifugal force on said seed, said air flow and centrifugal force aligning said seed to an aligned position relative to said seed path, said air flow moving said seed in said aligned position to a seed exit path; and
- removing said centrifugal force from said seed in said aligned position within said seed exit path; and
- ejecting said seed in said aligned position from said seed exit path and into the earth, wherein said seed in said aligned position has a seed tip pointed down toward the earth and a seed germ pointed transverse to said seed row.

12. The method of claim 11, further comprising venting said air flow through at least one air vent extending radially from said seed path.

13. The method of claim 12, wherein venting said air flow includes venting said air flow through a plurality of air vents extending radially from said seed path.

14. The method of claim 11, wherein said seed path is curved, whereby said curved seed path and said air flow propelling said seed induces said centrifugal force and maintains said seed in said aligned position.

15. The method for planting an oriented seed of claim 14, wherein said seed orientation coil assembly includes an injector core and a vented outer coil, the method further including, maintaining an airflow through the injector core and the vented outer coil so as to push the seed up a seed riding surface to a seed guide wall.

16. A seed orientation system, comprising:
- a helical seed orientation coil defining a helical seed path about a generally vertical axis through which seed passes from an upper seed entrance toward a lower seed exit, the helical seed path including:
- a banked seed riding surface; and
- a seed guide wall intersecting with a radial outward and upward edge of said banked seed riding surface;
- whereby, as the seed passes through said helical seed path, the seed is subjected to gravitational force, a centrifugal force and a friction force, wherein the gravitational force maintains the seed in sliding contact with said helical seed path, and the centrifugal force in combination with the friction force inparts an orientation to the seed such that a major face of the seed orients in sliding contact with said banked seed riding surface, and a minor face of the seed orients in sliding contact with said seed guide wall, and a tip of the seed orients toward the seed exit.

* * * * *